US012186946B2

(12) United States Patent
Nalle et al.

(10) Patent No.: US 12,186,946 B2
(45) Date of Patent: Jan. 7, 2025

(54) FOOD CONTAINER AND METHODS AND SYSTEMS FOR MANUFACTURING FOOD CONTAINERS

(71) Applicant: Brown LLC, Beaverton, MI (US)

(72) Inventors: Tom Nalle, Beaverton, MI (US); Victor L. Chun, Beaverton, MI (US); Jess Long, Beaverton, MI (US); Seth Dickman, Beaverton, MI (US); Steffen Brown, Beaverton, MI (US); Koben Miceli, Beaverton, MI (US)

(73) Assignee: BROWN LLC, Beaverton, MI (US)

( * ) Notice: Subject to any disclaimer, the term of this patent is extended or adjusted under 35 U.S.C. 154(b) by 0 days.

(21) Appl. No.: 18/659,352

(22) Filed: May 9, 2024

(65) Prior Publication Data
US 2024/0375326 A1    Nov. 14, 2024

Related U.S. Application Data

(60) Provisional application No. 63/501,024, filed on May 9, 2023.

(51) Int. Cl.
B29C 43/40       (2006.01)
B29C 43/02       (2006.01)
B29L 31/00       (2006.01)

(52) U.S. Cl.
CPC ............ *B29C 43/40* (2013.01); *B29C 43/021* (2013.01); *B29C 43/027* (2013.01); *B29C 2043/023* (2013.01); *B29C 2043/403* (2013.01); *B29L 2031/712* (2013.01)

(58) Field of Classification Search
None
See application file for complete search history.

(56) References Cited

U.S. PATENT DOCUMENTS

| 2003/0030188 | A1 | 2/2003 | Spengler |
| 2007/0042072 | A1 | 2/2007 | Johns et al. |
| 2009/0065514 | A1 | 3/2009 | Vovan |
| 2009/0223952 | A1 | 9/2009 | Wnek et al. |

(Continued)

FOREIGN PATENT DOCUMENTS

DE    202021103354 U1    8/2021

OTHER PUBLICATIONS

International Search Report and Written Opinion in related PCT Application PCT/US 24/28536 mailed Oct. 8, 2024, 18 pages.

Primary Examiner — Robert J Grun
(74) Attorney, Agent, or Firm — HOVEY WILLIAMS LLP

(57) ABSTRACT

A pressware product includes a top piece and a bottom piece. The top piece includes a planar central portion, a sidewall extending from the central planar portion, and a flange extending horizontally from the sidewall. The flange includes a slot and a radially extending top groove. The bottom piece cooperatively defines an inner space with the top piece. The bottom piece includes a planar central portion, a sidewall extending from the central planar portion, and a flange extending horizontally from the sidewall. The flange includes a locking flap configured to engage the slot of the top piece and a radially extending bottom groove. The radially extending bottom groove cooperatively defines a channel with the top groove so that the channel is in fluid communication with the inner space.

16 Claims, 39 Drawing Sheets

(56) References Cited

U.S. PATENT DOCUMENTS

2010/0283182 A1 11/2010 Maatta et al.
2022/0097897 A1 3/2022 Bontrager et al.
2023/0008774 A1* 1/2023 Chun .................... B31B 50/12

* cited by examiner

FOOD CONTAINER AND METHODS AND SYSTEMS FOR MANUFACTURING FOOD CONTAINERS

RELATED APPLICATIONS

This regular utility non-provisional patent application claims priority benefit with regard to all common subject matter of U.S. Provisional Patent Application Ser. No. 63/501,024, filed May 9, 2023, entitled "FOOD CONTAINER AND METHODS AND SYSTEMS FOR MANUFACTURING FOOD CONTAINERS", U.S. Design patent application Ser. No. 29/931,408, filed Mar. 6, 2024, entitled "FOOD CONTAINER", U.S. Design patent application Ser. No. 29/931,412, filed Mar. 6, 2024, entitled "FOOD CONTAINER", U.S. Design patent application Ser. No. 29/932,778, filed March 15, entitled "FOOD CONTAINER", U.S. Design patent application Ser. No. 29/937,432, filed Apr. 15, 2024, entitled "FOOD CONTAINER", and U.S. Design patent application Ser. No. 29/937,438, filed Apr. 15, 2024, entitled "FOOD CONTAINER". The above-identified patent applications are hereby incorporated by reference in their entireties into the present patent application.

BACKGROUND

Food containers for circular food tend to be rectangular. For example, pizza boxes are rectangular even though pizzas are generally circular. This results in excess material and costs. Circular food containers exist but have various limitations. For example, existing circular food containers do not stack well because they tend to slide against one another. Further, because circular containers are shaped similar to the food held within, there is limited space in the containers. This often results in the circular containers deteriorating when enclosing heated food, such as pizzas, because the heat and steam from the heated food breaks down the structure of the circular containers. Further, manufacturing methods for forming existing circular containers are inefficient. Thus, there is a need for improved circular food containers and means for manufacturing the same.

The background discussion is intended to provide information related to the present invention which is not necessarily prior art.

SUMMARY

The present invention solves the above-described problems and other problems by providing improved circular food containers and methods of making the same. Embodiments of the invention include a pressware product, a forming tool, a system of forming a pressware product, and a method of forming a pressware product.

A pressware product constructed according to an embodiment of the present invention includes a top piece and a bottom piece. The top piece includes a planar central portion, a sidewall extending from the central planar portion, and a flange extending horizontally from the sidewall. The flange includes a slot and a radially extending top groove.

The bottom piece cooperatively defines an inner space when joined with the top piece. The bottom piece includes a planar central portion, a sidewall extending from the central planar portion, and a flange extending horizontally from the sidewall. The flange includes a locking flap configured to engage the slot of the top piece and a radially extending bottom groove. The radially extending bottom groove cooperatively defines a channel with the top groove so that the channel is in fluid communication with the inner space. This enables ventilation of the container, which is important for hot food items, such as pizza. Additionally, the flap and slot allow the top and bottom pieces to be identical when manufactured, thereby improving production efficiencies.

A pressware product constructed according to another embodiment of the invention includes a top piece and a bottom piece. The top piece includes a planar central portion, a sidewall extending from the central planar portion, and a flange extending horizontally from the sidewall. The flange includes a top slot formed therein with a top flap extending into the top slot.

The bottom piece cooperatively defines an inner space when joined with the top piece and includes a planar central portion, a sidewall extending from the central planar portion, and a flange extending horizontally from the sidewall. The flange includes a bottom slot operable to receive the top flap when the bottom piece is rotated relative to the top piece to couple the top and bottom pieces together. This enables quick and efficient coupling of the top and bottom pieces and similarly increases manufacturing efficiency.

A pressware product constructed according to yet another embodiment of the invention includes a top piece and a bottom piece. The top piece includes a planar central portion, a sidewall extending from the central planar portion, and a flange extending horizontally from the sidewall. The flange include includes a radially extending top flap.

The bottom piece cooperatively defines an inner space when joined with the top piece and includes a planar central portion, a sidewall extending from the central planar portion, and a flange extending horizontally from the sidewall. The flange includes a bottom slot operable to engage the top flap, thereby coupling the top and bottom pieces together. This enables quick and efficient coupling of the top and bottom pieces and similarly increases manufacturing efficiency.

A forming tool constructed according to an embodiment of the present invention includes a positive mold plate, a positive mold block, a negative mold plate, and a negative mold block. The positive mold plate includes an annular protrusion and elongated radial protrusions extending radially outward from the annular protrusion. The positive mold block is positioned within the annular protrusion. The negative mold plate defines a circular cavity operable to receive the annular protrusion and includes radial grooves extending radially from the cavity and operable to receive the elongated radial protrusions. The negative mold block is secured to the negative mold plate within the cavity. The forming tool enables efficient production of the pressware products summarized above. It further allows the blocks to be swapped for forming different features in the products, such as, for example, stacking structures.

A system according to an embodiment of the present invention includes a forming station and a scoring station. The forming station is configured to receive web material and includes a positive mold assembly, a negative mold assembly, and an actuator. The positive mold assembly includes a positive mold plate and a positive mold block. The positive mold plate includes an annular protrusion and elongated radial protrusions extending radially outward from the annular protrusion. The positive mold block is positioned within the annular protrusion. The negative mold assembly includes a negative mold plate and a negative mold block. The negative mold plate defines a circular cavity operable to receive the annular protrusion and includes radial grooves extending radially from the cavity and operable to receive the elongated radial protrusions. The negative mold block is secured to the negative mold plate within the cavity. The actuator is configured to cause the positive mold assembly and the negative mold assembly press against the web to form a shape of the pressware product. The scoring station is configured to receive the formed shape of the pressware product and includes one or more edges operable to form one or more slits in the web about the shape of the pressware product to facilitate formation of a flap in the pressware product. This system likewise enables efficient production of the pressware products summarized above. It further allows the blocks of the forming station to be swapped for forming different features in the products, such as, for example, stacking structures.

A system according to another embodiment of the invention includes a scoring station and a forming station. The scoring station is configured to receive a web and includes one or more flap-forming edges operable to score the web to facilitate formation of a flap in the pressware product. The forming station is configured to receive web material and includes a positive mold assembly, a negative mold assembly, and an actuator. The positive mold assembly includes a positive mold plate and a positive mold block. The positive mold plate includes an annular protrusion and elongated radial protrusions extending radially outward from the annular protrusion. The positive mold block is positioned within the annular protrusion. The negative mold assembly includes a negative mold plate and a negative mold block. The negative mold plate defines a circular cavity operable to receive the annular protrusion and includes radial grooves extending radially from the cavity and operable to receive the elongated radial protrusions. The negative mold block is secured to the negative mold plate within the cavity. The actuator is configured to cause the positive mold assembly and the negative mold assembly press against the web to form a shape of the pressware product. By scoring prior to formation of the product, the forming tool can also be configured to trim the product from the web, thereby increasing production efficiencies.

A method according to an embodiment of the present invention includes positioning, via one or more indexing rollers, a web between a positive mold assembly and a negative mold assembly. The positive mold assembly includes a positive mold plate including an annular protrusion and elongated radial protrusions extending radially outward from the annular protrusion, and a positive mold block positioned within the annular protrusion. The negative mold assembly includes a negative mold plate defining a circular cavity operable to receive the annular protrusion and includes grooves extending radially from the cavity and operable to receive the elongated radial protrusions, and a negative mold block secured to the negative mold plate within the cavity. The method also includes shifting, via an actuator, the positive and negative mold assemblies to press against the web to form a shape of the pressware product in the web; positioning, via one or more indexing rollers, the formed shape between a scoring tool comprising one or more edges operable to form one or more slits in the web about the shape of the pressware product to facilitate formation of a flap in the pressware product; and scoring, via the scoring tool, the web about the formed shape.

A method according to another embodiment of the invention includes positioning, via one or more indexing rollers, a web between a scoring tool including one or more flap-forming edges operable to score the web to facilitate formation of a flap in the pressware product; scoring, via the scoring tool, the web; and positioning, via one or more indexing rollers, the scored web between a positive mold assembly and a negative mold assembly. The positive mold assembly includes a positive mold plate including an annular protrusion elongated radial protrusions extending radially outward from the annular protrusion, and a positive mold block positioned within the annular protrusion. The negative mold assembly includes a negative mold plate defining a circular cavity operable to receive the annular protrusion and includes grooves extending radially from the cavity and operable to receive the elongated radial protrusions, and a negative mold block secured to the negative mold plate within the cavity. The method also includes shifting, via an actuator, the positive and negative mold assemblies to press against the web to form a shape of the pressware product in the web.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

Figure 1:
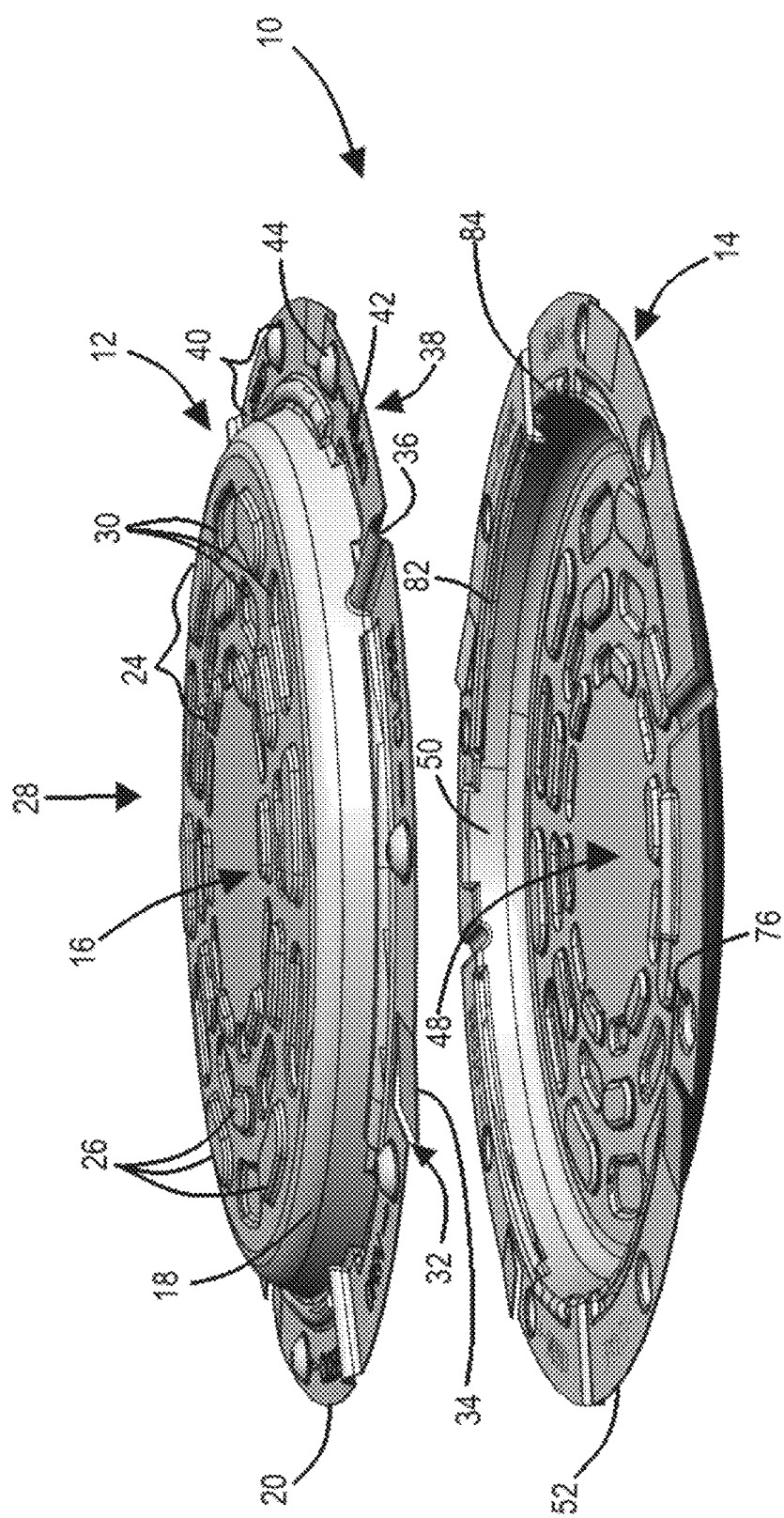
FIG. 1 is a perspective view of a food container constructed according to an embodiment of the present invention in an open or uncoupled state.

The drawing figures do not limit the present invention to the specific embodiments disclosed and described herein. The drawings are not necessarily to scale, emphasis instead being placed upon clearly illustrating the principles of the invention.

DETAILED DESCRIPTION

Figure 2:
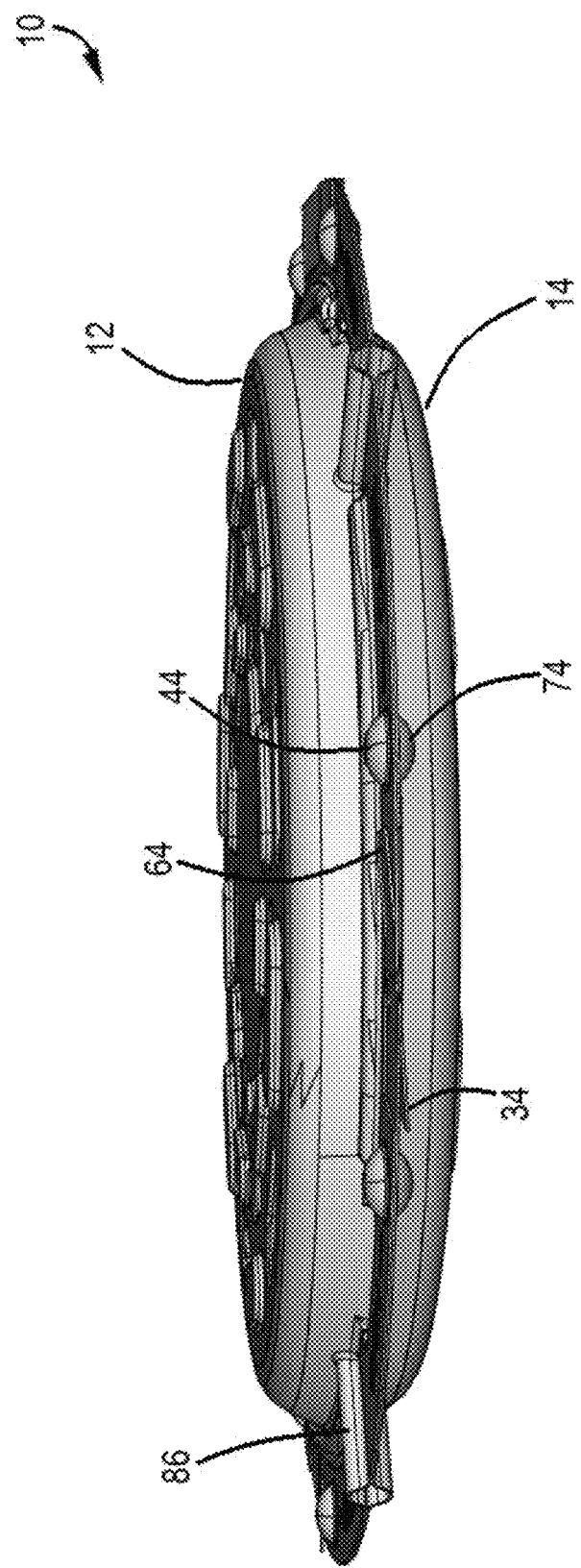
FIG. 2 is a perspective view of the food container of FIG. 1 in a closed or coupled state.
Figure 3:
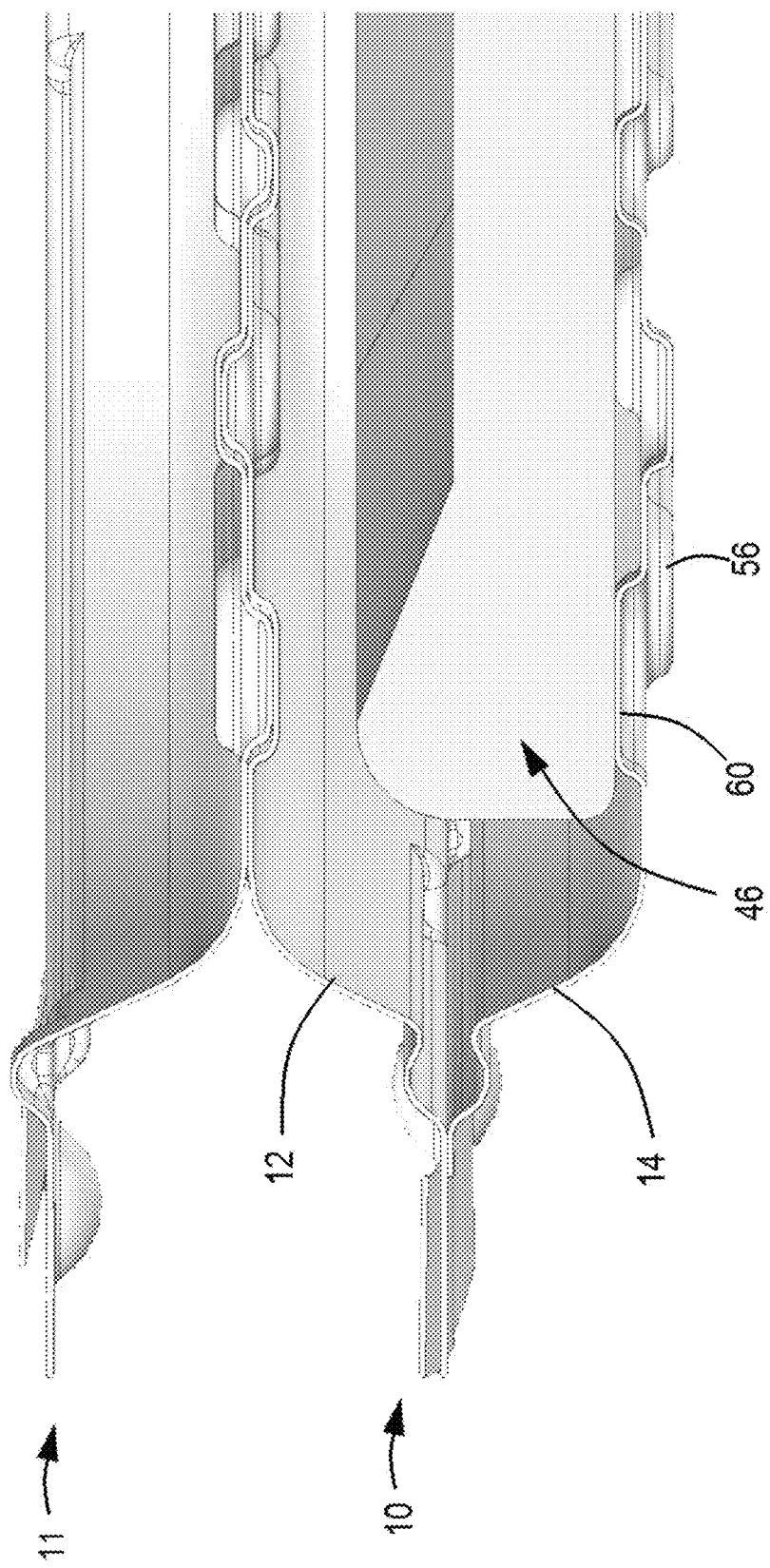
FIG. 3 is a cross sectional view of the food container of FIG. 1 with a second container constructed according to an embodiment of the invention stacked on top.
Figure 6:
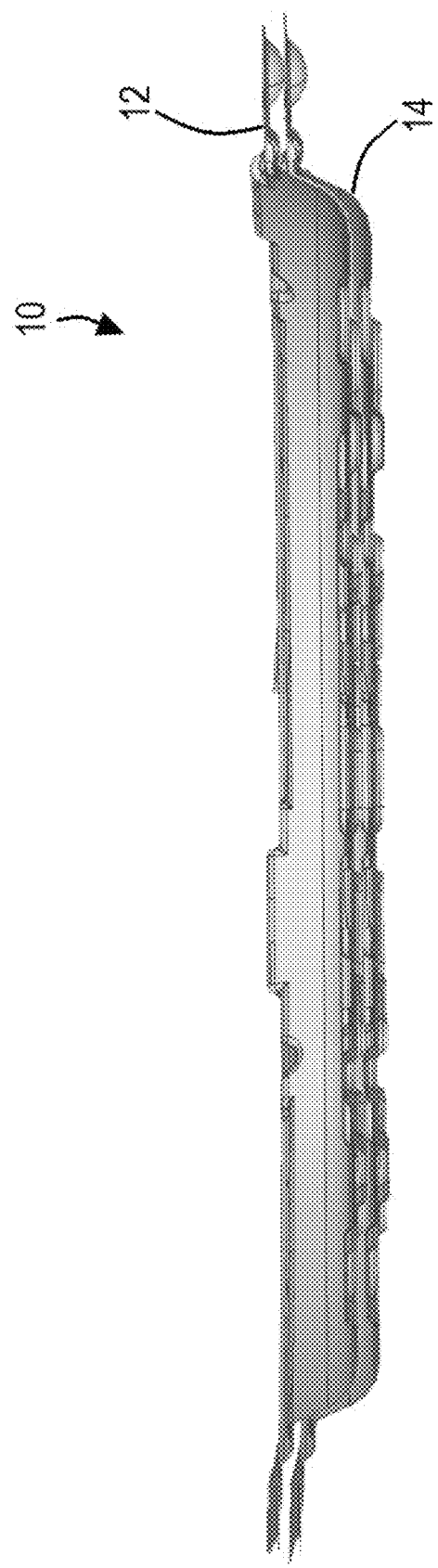
FIG. 6 is a cross sectional view of the food container of FIG. 1 with its top and bottom pieces facing the same direction and stacked together.

Turning to FIG. 1, a pressware product 10 constructed according to an embodiment of the present invention comprises a round or circular container 10 with a top piece 12 and a bottom piece 14. When facing one another, the top and bottom pieces 12, 14 are operable to couple together, as depicted in FIG. 2, to define an interior space of the container 10, as depicted in FIG. 3. When facing the same direction, the top and bottom pieces 12, 14 compactly stack on top of each other, as depicted in FIG. 6, which enables more efficient storage. Further, when facing opposite directions and positioned back-to-back, the top and bottom pieces 12, 14 are operable to engage one another so that multiple containers 10 can securely stack on top of one another, as depicted in FIG. 3. In one or more embodiments, the top and bottom pieces 12, 14 are interchangeable so that a top piece 12 can serve as a bottom piece 14, or vice versa. Further, in one or more embodiments, the top piece 12 and the bottom piece 14 are identical, which increases manufacturing and storage efficiencies. In other words, in one or more embodiments, the top piece 12 is identical to the bottom piece 14 so that a single set of tooling can manufacture a plurality of pieces 12, 14, and one or more of those pieces 12, 14 can serve as a top piece 12, and one or more of those pieces can serve as a bottom piece 14 of the product 10. In one or more embodiments, the top piece 12 and the bottom piece 14 comprise cellulose fiber, such as paper, cardstock, or the like.

Turning back to FIG. 1, the top piece 12 comprises a planar central portion 16, a sidewall 18 extending from the central planar portion 16, and a flange 20 extending horizontally from the sidewall 18. In one or more embodiments, the planar central portion 16 includes one or more stacking structures 24 that are operable to engage corresponding stacking structures of the bottom piece 14, as discussed in further detail below. In one or more embodiments, the stacking structures 24 include one or more protrusions 26 extending from the top side 28 of the top piece 12 and/or one or more indentations 30 formed in the top side 28.

The sidewall 18 is a generally vertical wall extending from the planar central portion 16. The flange 20 extends generally horizontally from the sidewall 18 and comprises one or more top slots 32 and one or more top flaps 34 extending into the top slots 32. The flange 20 generally forms a projection or rim extending from the edge of the sidewall 18. The slots 32 and flaps 34 may be formed by scoring the flange 20. In one or more embodiments, the slots 32 comprise grooves or openings formed in the flange 20. The slots 32 are operable to receive corresponding flaps of the bottom piece 14, as discussed in further detail below. In one or more embodiments, the flaps 34 generally extend in a direction that is tangential relative to the circumference of the central planar portion 16, the sidewall 18, and/or the rest of the flange 20. The flaps 34 are operable to be inserted into the slots of the bottom piece 14, as discussed below.

In one or more embodiments, the flange 20 further comprises one or more radially extending top grooves 36 for cooperatively defining a steam channel with a groove of the bottom piece. The grooves 36 are formed into the bottom side 38 of the top piece 12 and extend into the sidewall 18, thereby defining a passageway from an interior space defined by the sidewall 18 and central planar portion 16. The grooves 36 allow airflow into and out of the container 10.

In one or more embodiments, the flange 20 includes one or more indicia 40 formed thereon. In one or more embodiments, the indicia 40 includes text or other characters 42 embossed on the flange 20 and one or more compressible bumps 44. In one or more embodiments, a compressible bump 44 in conjunction with one or more adjacent characters 42 provides an indication regarding a type of item held within the container 10, such as a type of pizza. In one or more embodiments, one or more of the compressible bumps 44 extend upwards from the top side 28 of the top piece 12 and are operable to be compressed until they are inverted and extend from the bottom side 38 of the top piece 12 into cavities defined by corresponding bumps of the bottom piece 14.

The bottom piece 14 cooperatively defines an inner space 46 (depicted in FIG. 3) with the top piece 12. The bottom piece 14 comprises a planar central portion 48, a sidewall 50 extending from the central planar portion 48, and a flange 52 extending horizontally from the sidewall 50. In one or more embodiments, the planar central portion 48 includes one or more stacking structures 54 that are operable to engage corresponding stacking structures 24 of the top piece 12. In one or more embodiments, the stacking structures 54 include one or more protrusions 56 (best shown in FIG. 3) extending from the bottom side 58 of the bottom piece 14 and/or one or more indentations 60 (best shown in FIG. 3) formed into the bottom side 58. The cavities 57 defined by the protrusions 56 as viewed from the top side 68 of the bottom piece 14 serve as grease wells for collecting grease or other liquids of the item held in the container 10.

Figure 4:
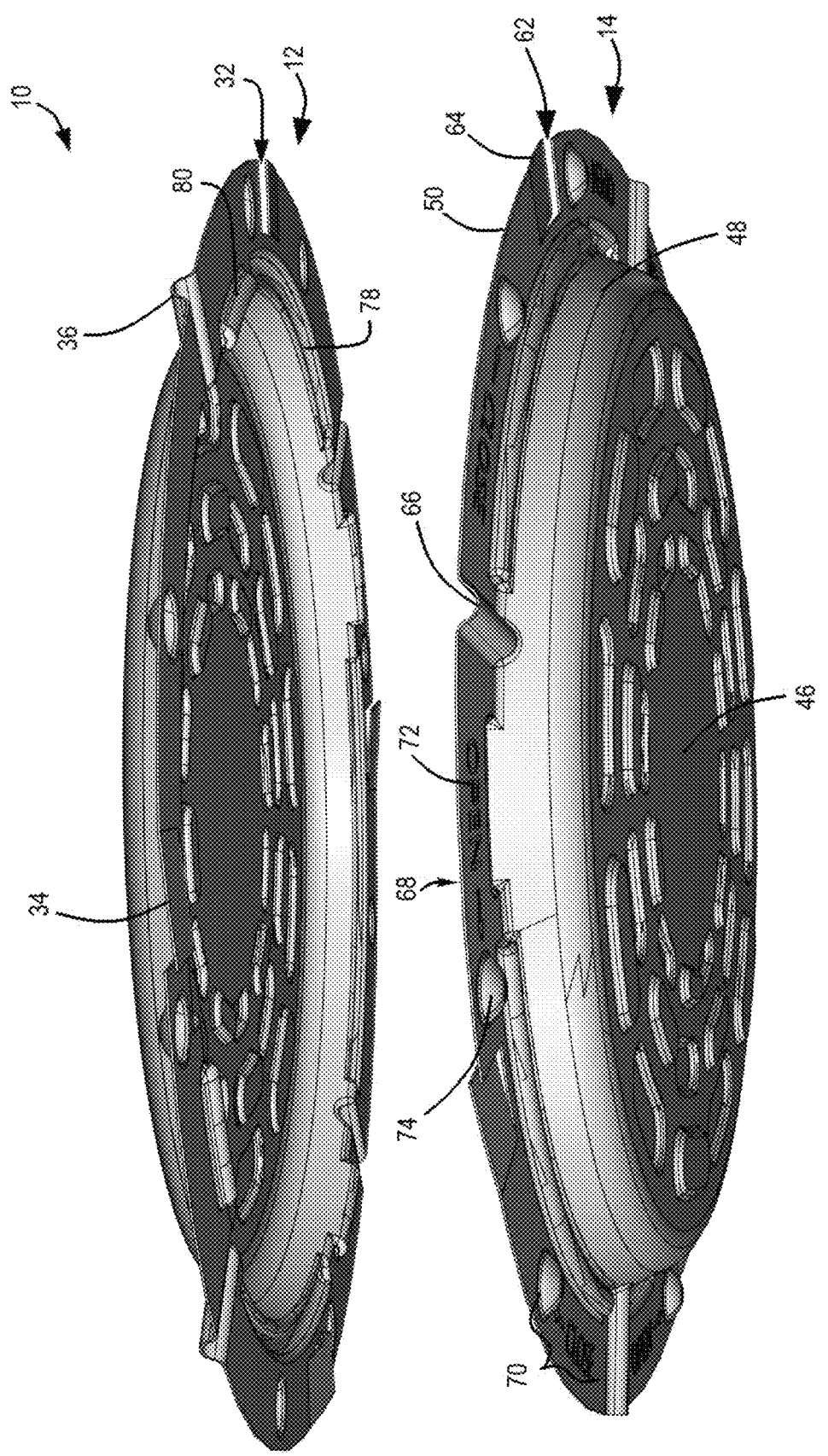
FIG. 4 is a lowered perspective view of the food container of FIG. 1.

Turning to FIG. 4, the sidewall 48 is a generally vertical wall extending from the planar central portion 46. The flange 50 extends generally horizontally from the sidewall 48 and comprises one or more bottom slots 62 and one or more bottom flaps 64 extending into the top slots 62. The flange 50 generally forms a projection or rim extending from the edge of the sidewall 48. The slots 62 and flaps 64 may be formed by scoring the flange 50. In one or more embodiments, the slots 62 comprise grooves or openings formed in the flange 50. The slots 62 are operable to receive corresponding flaps 34 of the top piece 12. In one or more embodiments, the flaps 64 generally extend in a direction that is tangential relative to the circumference of the central planar portion 46, the sidewall 48, and/or the rest of the flange 50. The directions that the flaps 64 extend are generally opposite to the directions of the corresponding top flaps 34 so that the flaps 34, 64 slide against one another and enter respective slots 32, 62 when the top and bottom pieces 12, 14 are rotated relative to one another.

In one or more embodiments, the flange 50 of the bottom piece 14 also comprises one or more radially extending bottom grooves 66 for cooperatively defining steam channels with the top grooves 36 of the top piece 12. The grooves 66 are formed into the top side 68 of the bottom piece 14 and extend into the sidewall 48, thereby defining a passageway from an interior space defined by the sidewall 48 and central planar portion 46. The grooves 66 allow airflow into and out of the container 10.

In one or more embodiments, the flange 50 of the bottom piece 14 also includes one or more indicia 70 formed thereon. In one or more embodiments, the indicia 70 includes text or other characters 72 embossed on the flange 50 and one or more compressible bumps 74. In one or more embodiments, a compressible bump 74 in conjunction with one or more adjacent characters 72 provides an indication regarding a type of item held within the container 10, such as a type of pizza. In one or more embodiments, one or more of the compressible bumps 74 extend downwards from the bottom side 58 of the bottom piece 14 and define cavities 76 (depicted in FIG. 1) that receive compressed bumps 44 of the top piece 12. This prevents the top and bottom pieces 12, 14 from rotating relative to one another, which in conjunction with the flaps 34, 64 being inserted in respective slots 32, 62, helps couple the top and bottom pieces 12, 14 together.

In one or more embodiments, the top piece 12 further comprises one or more circumferentially extending grooves 78 and one or more guides 80. Similarly, the bottom piece 14 includes one or more corresponding circumferentially extending grooves 82 (depicted in FIG. 1) and one or more corresponding guides 84 (depicted in FIG. 1). The pieces 12, 14 are operable to face one another with the guides 80 of the top piece 12 facing the grooves 82 of the bottom piece 14, and the guides 84 of the bottom piece 14 facing the grooves 78 of the top piece 12. When in such alignment and pushed together, the guides 80 of the top piece 12 extend into the grooves 82 of the bottom piece 14, and the guides 84 of the bottom piece 14 extend into the grooves 78 of the top piece 12. When the pieces 12, 14 are rotated relative to one another, the guides 80, 84 slide within the respective grooves 78, 82 until the guides 80, 84 abut terminal ends of the grooves 78, 82. In one or more embodiments, the guides 80, 84 and grooves 78, 82 are configured so that the guides 80, 84 abut the terminal ends of the grooves 78, 82 when the flaps 34, 64 are completely within the respective slots 32, 62, when the bumps 44, 74 are aligned with one another, and when the venting grooves 36, 66 are aligned with one another. Such a configuration is enabled by the locations of the guides 80, 84 and grooves 78, 82 relative to the flaps 34, 64, bumps 44, 74, and venting grooves 36, 66, as well as the lengths of the guides 80, 84 and grooves 78, 82.

Turning to FIG. 2, when the top and bottom pieces 12, 14 face one another and are rotated relative to one another, the pieces 12, 14 couple together via the slots 32, 62 and flaps 34, 64. The flap 34 of the top piece 12 slides against the bottom side of the flap 64 of the bottom piece 14 and into the slot 62 of the bottom piece 14. Similarly, the flap 64 of the bottom piece 14 slides against the top side of the flap 34 of the top piece 12 and into the slot 32 of the top piece 12. The grooves 36, 66 of the top and bottom pieces 12, 14 align to form the steam channels or vent channels 86. Further, the bumps 44, 74 are aligned so that either the top bump 44 or bottom bump 74 can be compressed and inverted so that it extends into the cavity defined by the other bump.

Figure 5:
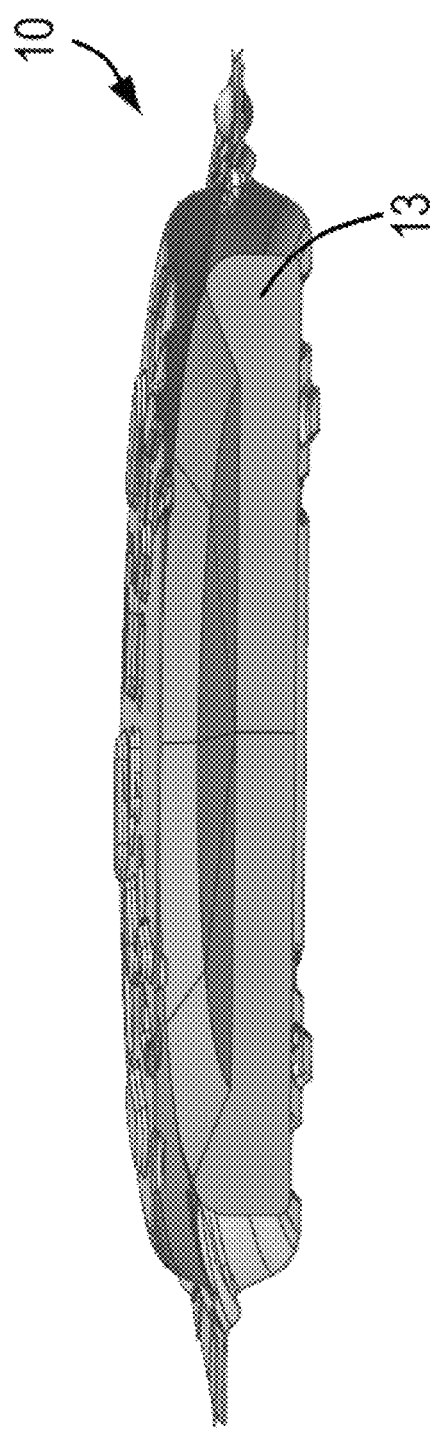
FIG. 5 is a cross sectional view of the food container of FIG. 1 with a food item placed inside the container.

Turning to FIG. 3, when the top and bottom pieces 12, 14 are coupled, they define the interior space 46 in which an item 13 (depicted in FIG. 5), such as a pizza, pie, or other food item, may be contained. Further, an additional container 11 similar or identical to container 10 may be stacked on top of the top piece 12 of the container 10. The additional container 11 may be secured to the top piece 12 of the container 10 via the stacking structure of the top piece 12 and the bottom piece of the additional container 11.

Figure 7:
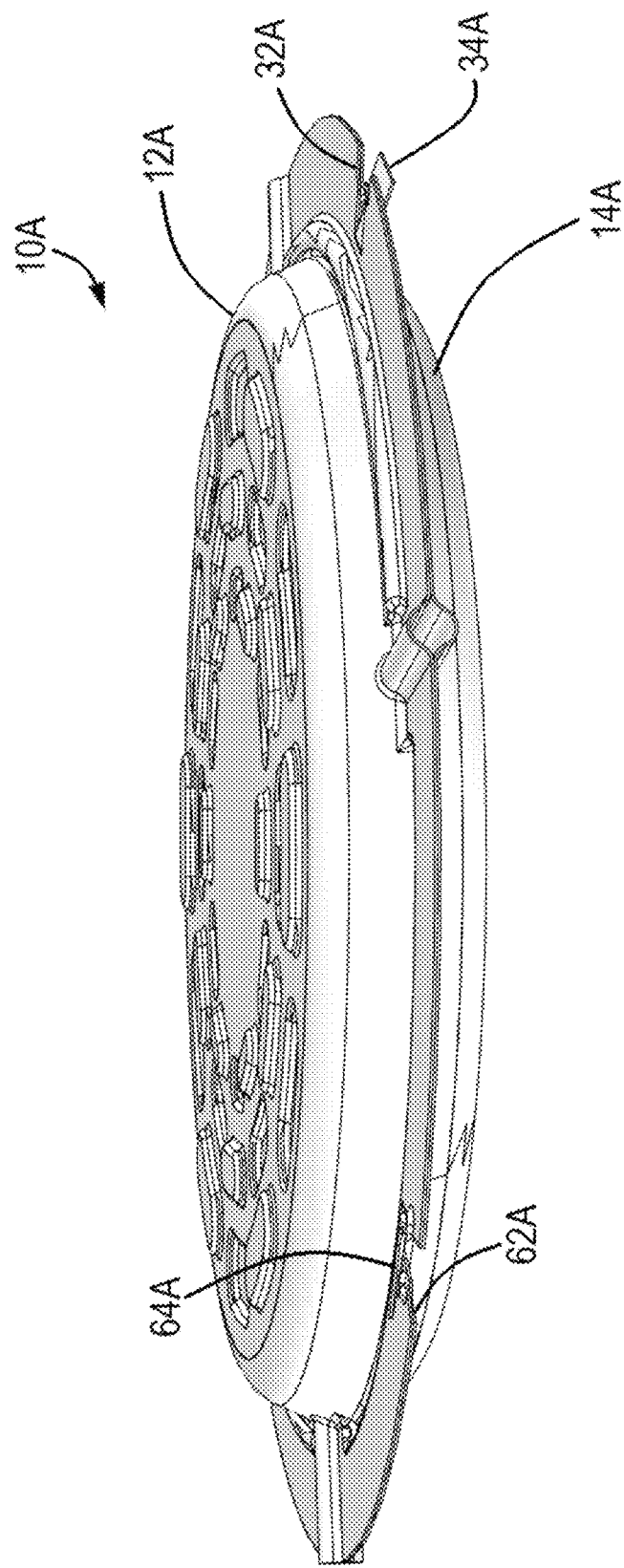
FIG. 7 is a perspective view of a food container constructed according to another embodiment of the present invention in a closed or coupled state.

A container 10A constructed in accordance with another embodiment of the invention is shown in FIG. 7. The container 10A comprises some similar components as container 10; thus, the components of container 10A that correspond to similar components in container 10 have an 'A' appended to their reference numerals.

Figure 8:
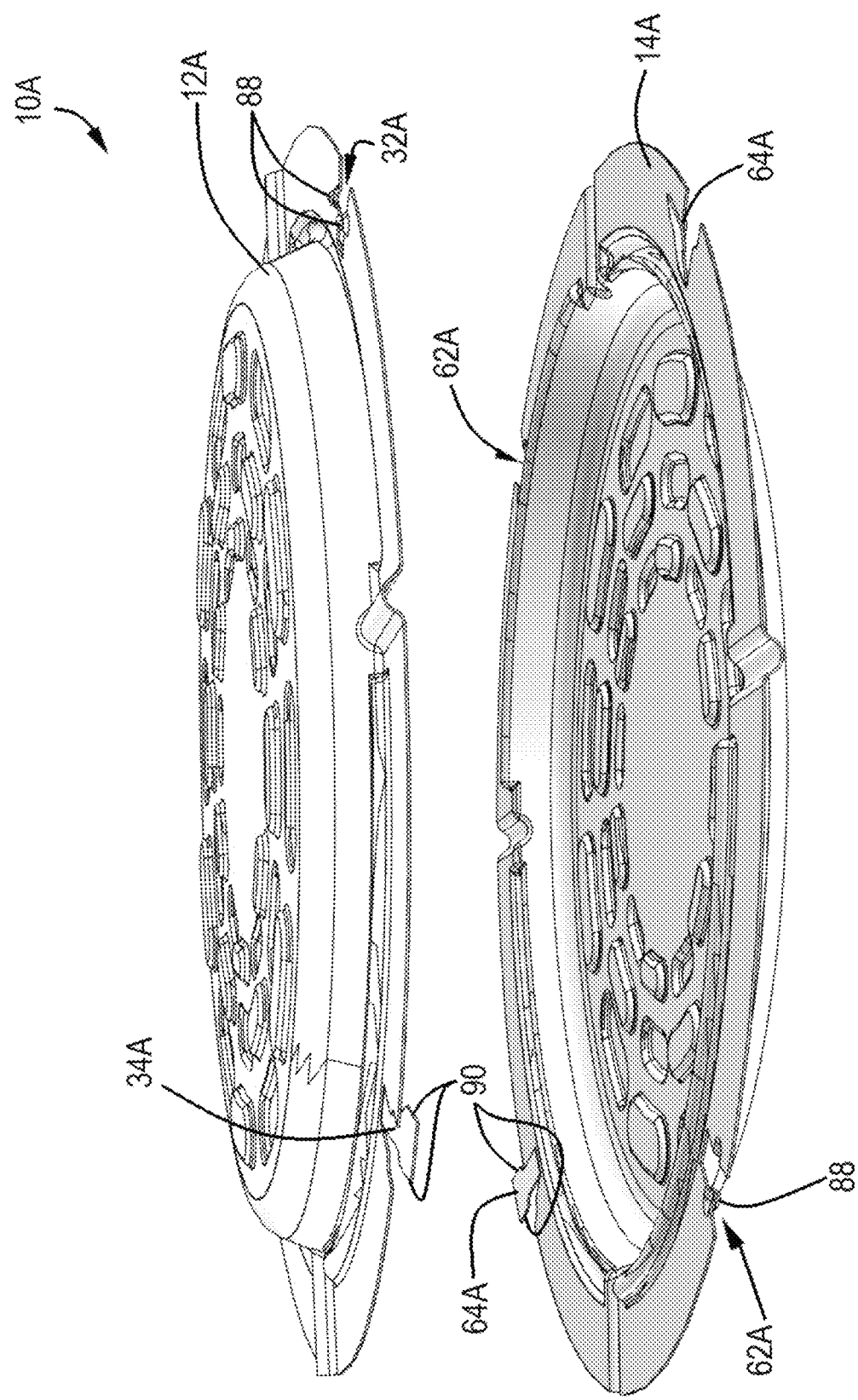
FIG. 8 is a perspective view of the food container of FIG. 7 in an open or uncoupled state.

The container 10A is substantially similar to container 10 except that the flaps 34A, 64A extend radially outward and fold upwards or downwards to latch to the slots 32A, 62A. Turning to FIG. 8, the slots 32A, 62A further comprise bumps 88 for catching corresponding flaps 34A, 64A. In one or more embodiments, the slots 32A, 62A are shaped to receive the flaps 34A, 64A, and the bumps 88 catch the flaps 34A, 64A when the flaps 34A, 64A are pivoted past the bumps 88. In one or more embodiments, the flaps 34A, 64A are T-shaped and include outwardly projecting tabs 90. The tabs 90 are operable to abut the bumps 88 when their respective flaps 34A, 64A are pivoted past the bumps 88.

Similar to container 10, in one or more embodiments, the top and bottom pieces 12A, 14A are interchangeable so that a top piece 12A can serve as a bottom piece 14A, or vice versa. Further, in one or more embodiments, the top piece 12A and the bottom piece 14A are identical, which increases manufacturing and storage efficiencies. In other words, in one or more embodiments, the top piece 12A is identical to the bottom piece 14A so that a single set of tooling can manufacture a plurality of pieces 12A, 14A, and one or more of those pieces 12A, 14A can serve as a top piece 12A, and one or more of those pieces can serve as a bottom piece 14A of the product 10A.

Figure 9:
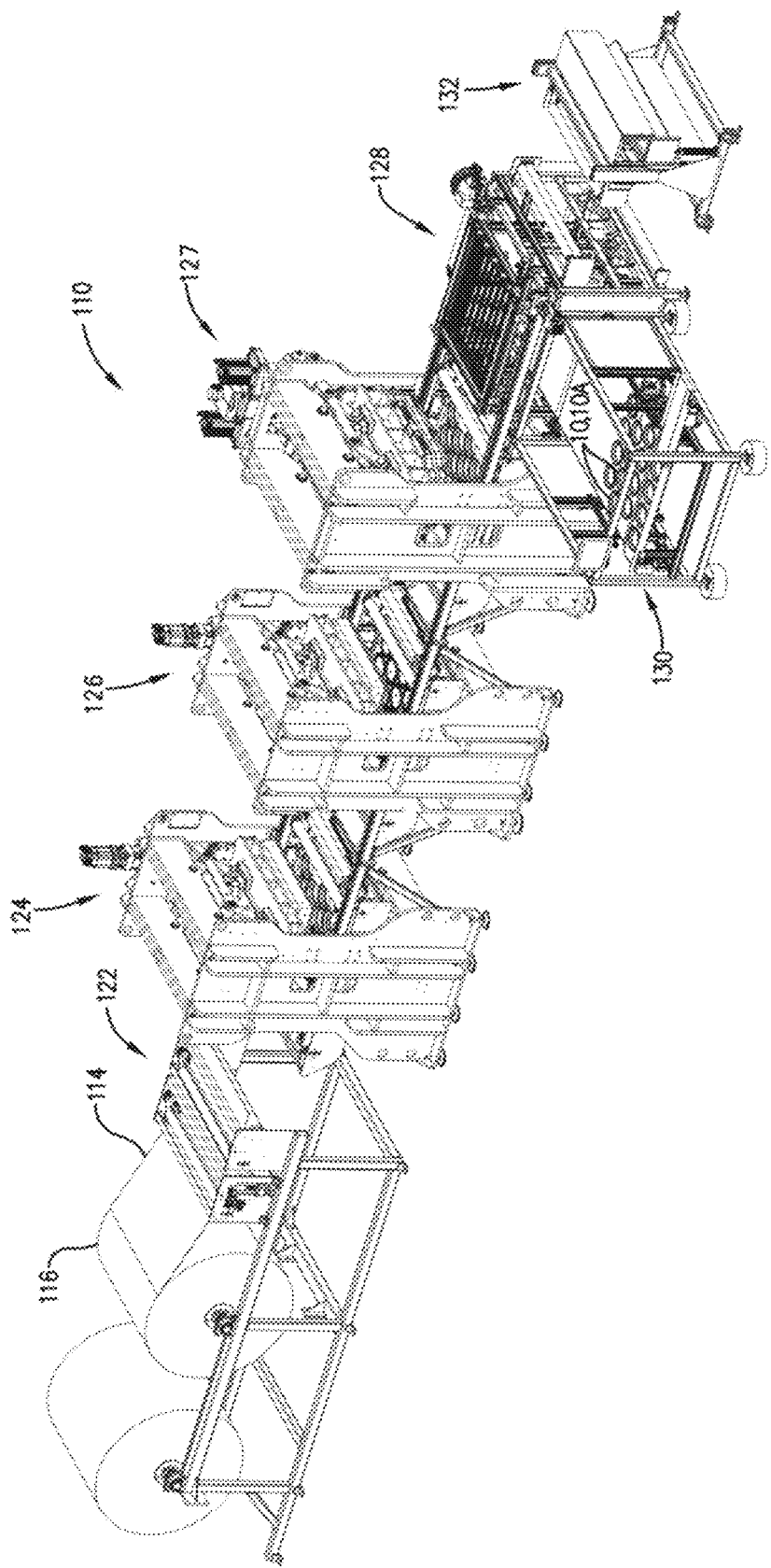
FIG. 9 is a perspective view of a system of manufacturing a food container constructed according to an embodiment of the present invention.

Turning to FIG. 9, a system 110 constructed in accordance with an embodiment of the invention is illustrated. The system 110 is configured to form the top and/or bottom pieces 12, 12A, 14, 14A of the pressware product 10, 10A in a web 114 from a roll of material 116. The material 116 may comprise paper, polystyrene, recycled paper, vegetable or organic matter, cotton, bamboo, or the like. The roll of material 116 may have a diameter 118 or radius 120 (depicted in FIG. 11).

Figure 10:
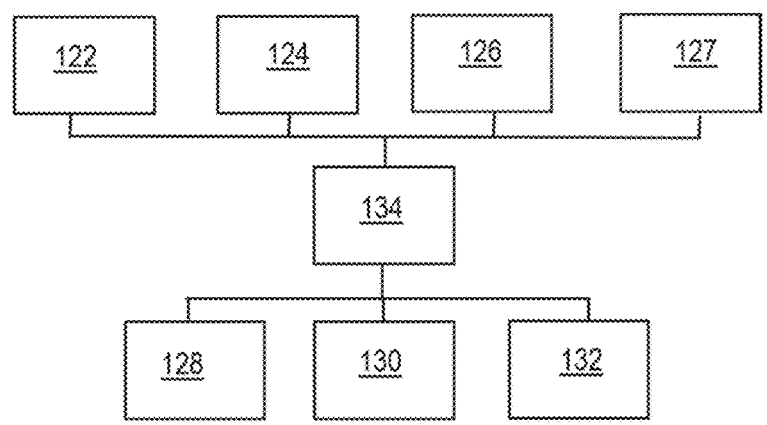
FIG. 10 is a block diagram depicting selected components of the system of FIG. 9.

An embodiment of the system 110 comprises a decurling station 122, a forming station 124, a scoring station 126, a trimming station 127, a picking station 128, a stacking station 130, a chopping station 132, and a control system 134 (schematically depicted in FIG. 10). However, one or more of the stations may be omitted without departing from the scope of the present invention. Additional preferred details of the aforementioned stations are disclosed in U.S. Publication No. 2023/0009038, published Jan. 12, 2023, entitled METHODS AND SYSTEMS FOR PRODUCING PRESSWARE, and U.S. Publication No. 2023/0008774, published Jan. 12, 2023, entitled METHODS AND SYSTEMS FOR PRODUCING PRESSWARE, which is hereby incorporated in its entirety by reference herein. For example, in one or more embodiments, the system 110 may include the scoring station as described in the aforementioned publication for scoring the web 114 prior to forming the products 10, 10A in the web 114.

Figure 11:
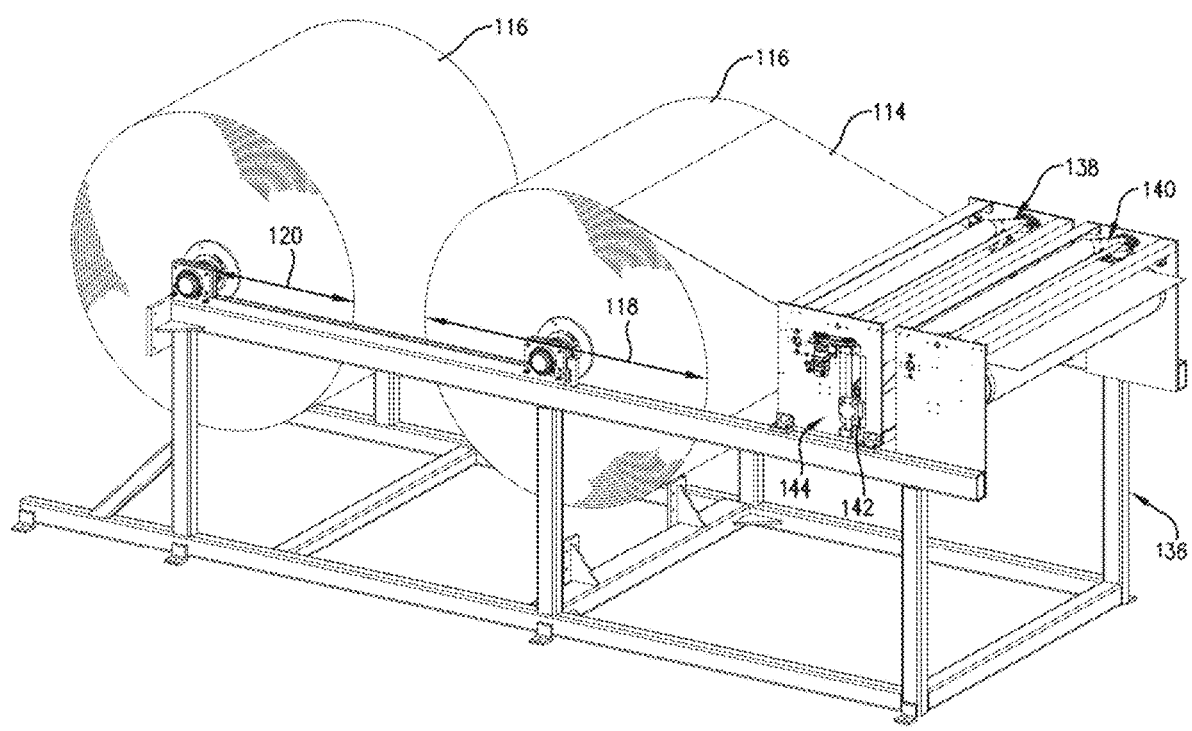
FIG. 11 is an elevated perspective view of a decurling station of the system of FIG. 9.

Turning to FIG. 11, the decurling station 122 is configured to pull the web 114 along a path with an angle. The decurling station 122 may include a frame 136, a pair of pull roller assemblies 138, 140, a decurl roller 142, a decurling station actuator 144, and a sensor.

The frame 136 may support one or more rolls of material 116, the pull roller assemblies 138, 140, the decurl roller 142, and the decurling station actuator 144. The assemblies 138, 140 are configured to pull the web 114 from the roll 116. The decurl roller 142 is shiftable to change the angle of the path through which the web 114 is pulled to counteract the intrinsic curling of the web 114 as the diameter 118 or radius 120 of the remaining roll 116 decrease. The decurl roller 142 is rotatable so that it rotates as the web 14 is pulled through the path and is vertically shiftable to increase or decrease the angle 143. The decurling station actuator 144 is configured to shift the decurl roller 142 to affect the angle 143 of the path. As used herein, an "actuator" may comprise any device or machine known in the art to achieve physical movements, including linear actuators, electrical actuators, hydraulic actuators, pneumatic actuators, electric motors, rotary actuators, piezoelectric actuators, or the like.

The sensor is configured to sense a characteristic of the roll 116 and generate sensor data based on the characteristic. The characteristic may be a weight of the roll 116, the diameter 118, the radius 120, a distance between an outer surface of the roll 116 and the sensor (which may be indicative of the diameter 118 or radius 120), or the like. The sensor may comprise a distance measuring device, such as a laser distance sensor, a load cell, or the like. The sensor is configured to send a signal representative of the sensor data to the control system 134.

Figure 12:
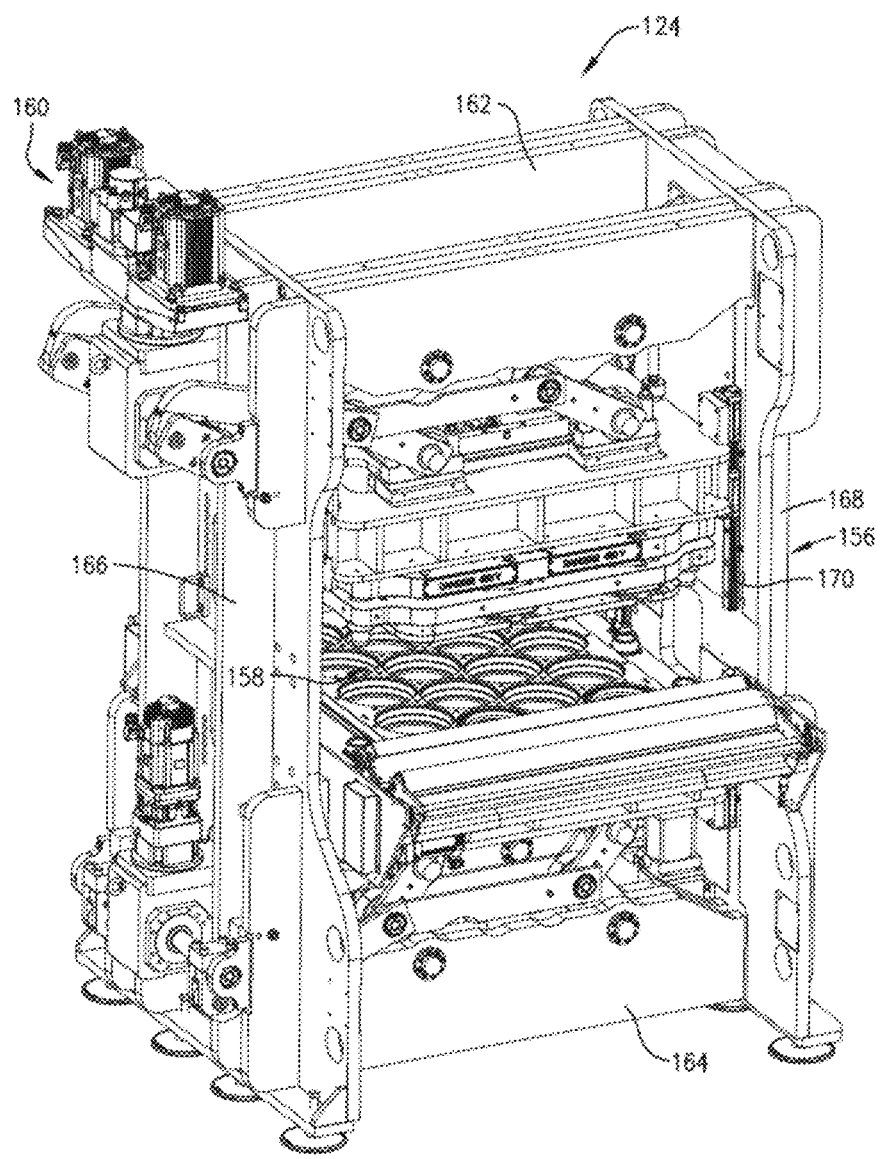
FIG. 12 is a perspective view of a forming station of the system of FIG. 9.

Turning to FIG. 12, the forming station 124 is configured to receive the web 114 and form the top and/or bottom pieces 12, 12A, 14, 14A of the products 10, 10A. The forming station 124 may comprise a forming station frame 156, a forming tool 158, and one or more forming station actuator 160. The forming station frame 156 is configured to support the forming tool 158 and the forming station actuator 160. The frame 156 may include an upper gantry 162 and a lower gantry 164 for supporting different portions of the forming tool 158 and the forming station actuator 160. The frame 156 may also include upright supports 166, 168 for supporting the gantries 162, 164. The upright supports 166, 168 may include one or more tracks 170 for guiding the forming tool 158 and/or portions of the actuator 160.

Figure 13:
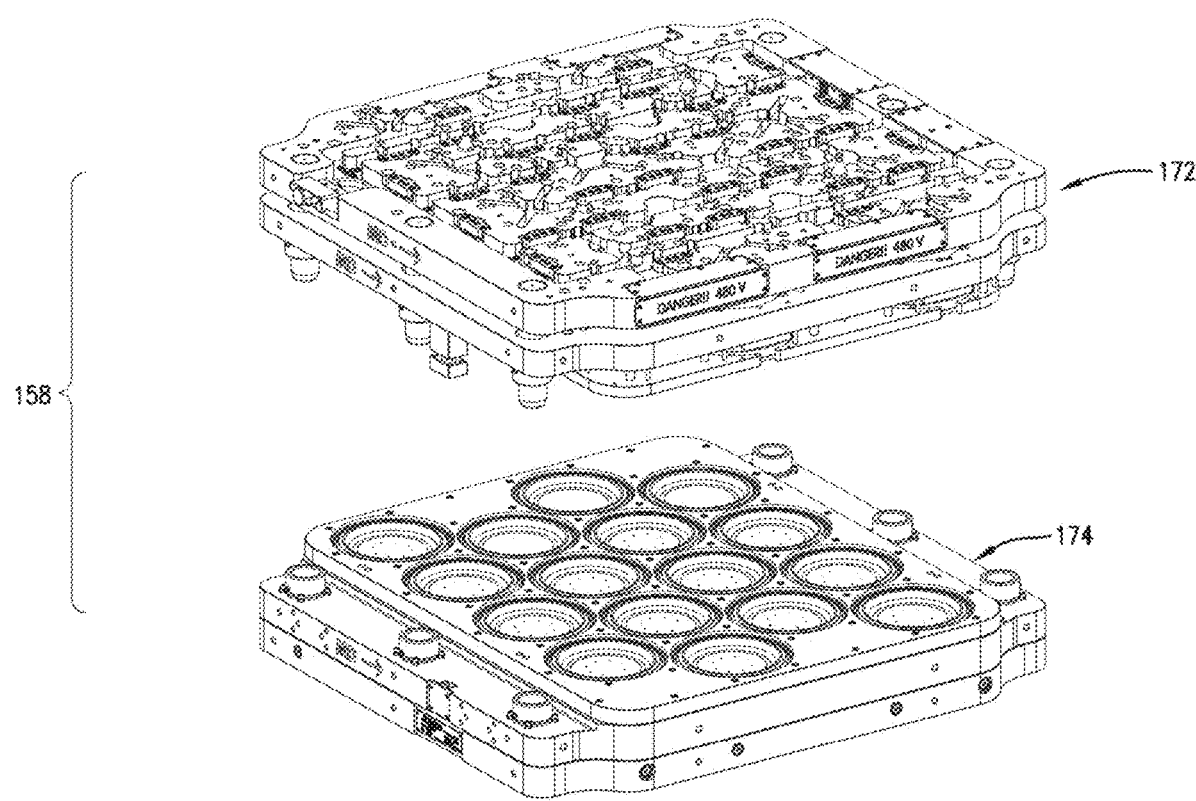
FIG. 13 is an elevated perspective view of a forming tool of the forming station of FIG. 12.
Figure 14:
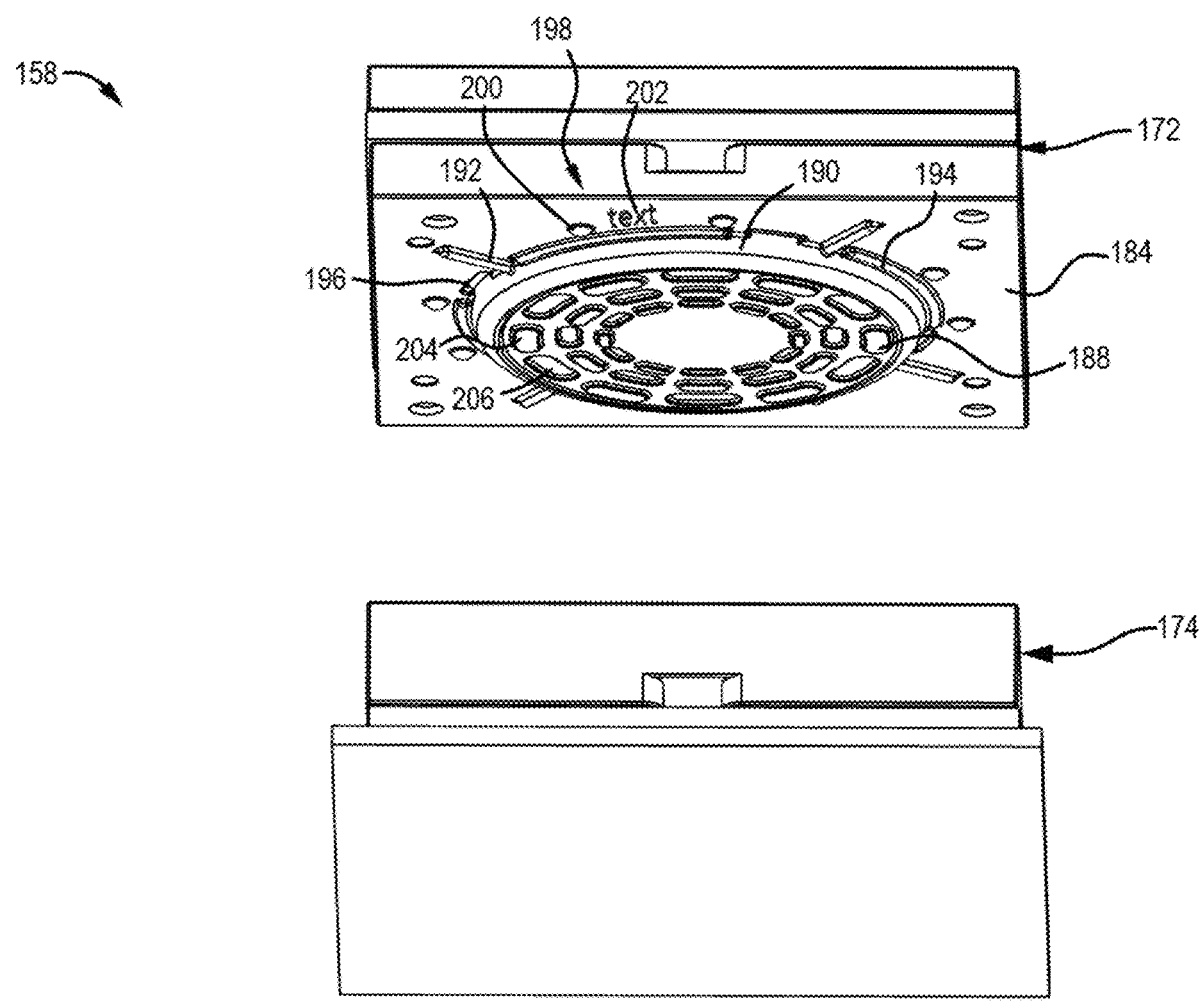
FIG. 14 is a lowered perspective view of a section of the forming tool of FIG. 13.
Figure 15:
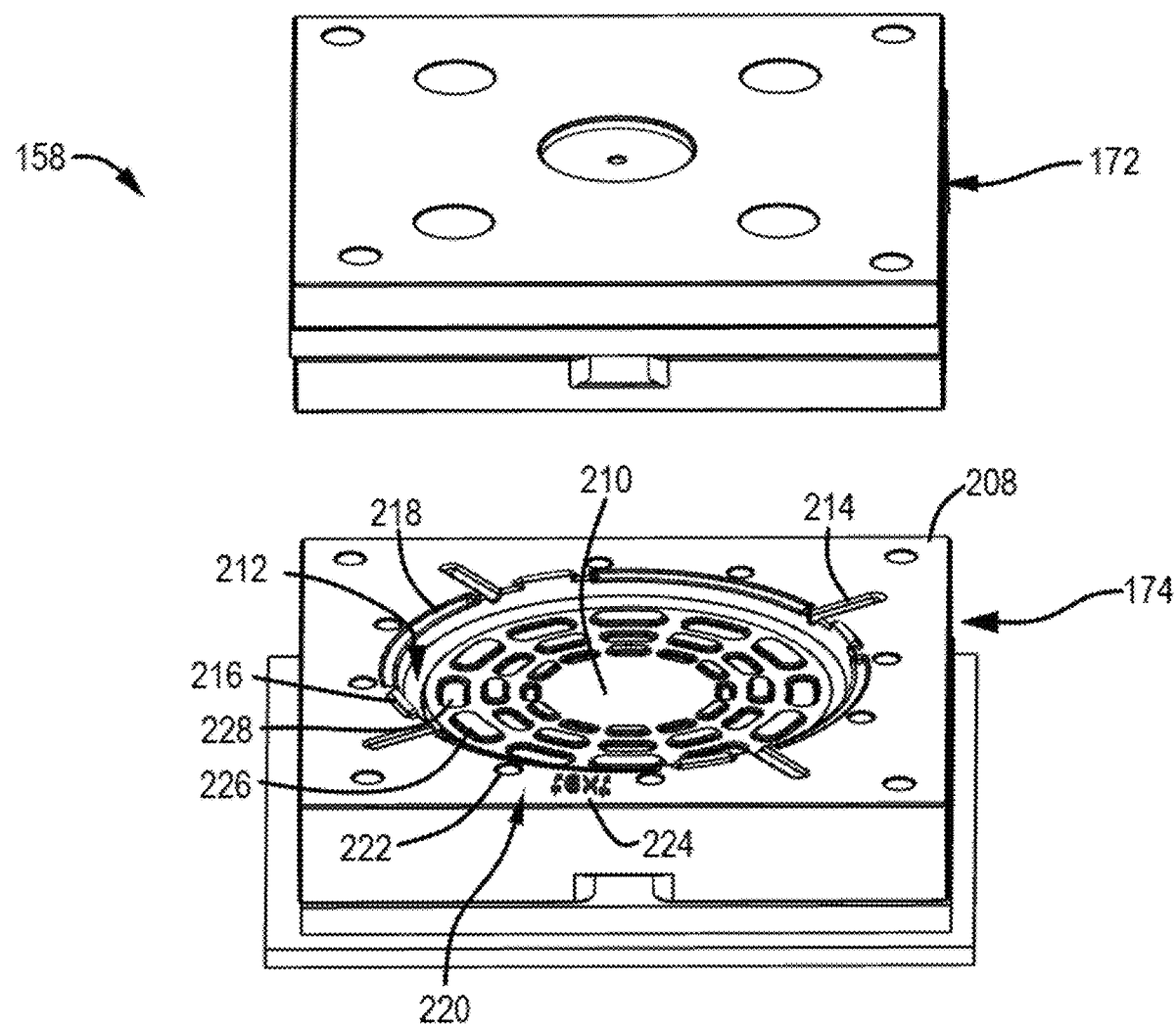
FIG. 15 is an elevated perspective view of the section of the forming tool of FIG. 13.

Turning to FIG. 13, the forming tool 158 is configured to be actuated to form the products 10, 10A. The forming tool 158 may include a positive mold assembly 172 and a negative mold assembly 174. FIGS. 14 and 15 depict a representative section of the positive and negative mold assemblies 172, 174 cut out of the remainder of the forming tool 158. The positive mold assembly 172 comprises a positive mold plate 184 and one or more positive mold blocks 188.

The positive mold plate 184 includes one or more annular protrusions 190, a plurality of elongated radial protrusions 192, one or more guide protrusions 194, and one or more guide recesses 196. The annular protrusion 190 helps form the sidewall 18 of one of the products 10. While FIG. 14 depicts the annular protrusion 190 being circular, the protrusion 190 may be any shape without departing from the scope of the present invention.

The elongated radial protrusions 192 extend radially outward from their respective annular protrusions 190 and help form the grooves 36, 66 that define the steam vent channel 86. The protrusions 192 physically extend from the annular protrusions 190 so that an unobstructed channel 86 is formed in the product 10. While FIG. 14 depicts the protrusions 192 extending straight outward radially from the annular protrusion, the protrusions 192 may take other shapes or define other paths without departing from the scope of the present invention.

The guide protrusions 194 are positioned at least partially radially outward of a perimeter of their respective annular protrusion 190 and extend parallel to the perimeter along a segment of the annular protrusion 190. The guide protrusions 194 help form the circumferentially extending guide grooves 78, 82 of the product 10. The top of the guide protrusions 194 and the top of the annular protrusion 190 may define a trough therebetween. This ensures that crests are formed in the grooves 78, 82 of the product, which help maintain the corresponding guides 80, 84 in the grooves 78, 82. The guide recesses 196 are also at least partially positioned radially outward from the perimeter of the annular protrusion 190 and are spaced apart from the elongated guide protrusions 194. The guide recesses 196 help form the guides 80, 84 of the product 10. In one or more embodiments, the guide protrusions 194 are longer than the guide recesses 196 so that the guides 80, 84 can slide within the guide grooves 78, 82.

In one or more embodiments, the positive mold plate 184 includes projections 198 for helping form the indicia 70 on the presswareproduct 10. The projections 198 may be spaced about the annular protrusion 190. In one or more embodiments, the projections comprise bumps 200 for forming the bumps 44, 74 of the product 10 and embossed or raised characters 202 for forming the characters 42, 72 of the product 10.

The positive mold block 188 is positioned within the annular protrusion 190 of the positive mold plate 188 and is operable to help form the central planar portion 48 of the product 10. In one or more embodiments, the positive mold block 188 includes protrusions 204 and/or indentations 206 for helping form the stacking structures 24 of the pressware product 10. The protrusions 204 and/or indentations 206 may be any shape without departing from the scope of the present invention. By having modular mold blocks, different blocks can be used to form different stacking structures; however, in one or more embodiments, the positive mold block 188 and plate 184 are an integral piece.

Turning to FIG. 15, the negative mold assembly 174 comprises a negative mold plate 208 and one or more negative mold block 210. The negative mold plate 208 defines one or more circular cavity 212 operable to receive the annular protrusion 190 and the block 188 of the positive mold plate 184 and includes a plurality of radial grooves 214 extending radially from and in fluid communication with the cavity 212. The radial grooves 214 correspond to and are operable to receive the elongated radial protrusions 192 of the positive mold plate 184 to help form the grooves 36, 66 in the product 10. The negative mold plate 208 also includes guide protrusions 216 corresponding to and operable to extend into the guide recesses 196 of the positive mold plate 184 to help form the guides 80, 84. The guide protrusions 216 are at least partially positioned radially outward from the perimeter of the cavity 212. The negative mold plate 208 also includes guide recesses 218 corresponding to and configured to receive the guide protrusions 194 of the positive mold plate 184 to help form the guide grooves 78, 82 of the part 10. The guide recesses 218 are at least partially positioned radially outward from the perimeter of the cavity 212 and define a crest therebetween. The guide recesses 218 and the guide protrusions 216 are spaced apart circumferentially about the cavity 212. In one or more embodiments, the guide recesses 218 of the negative mold plate 208 are longer than the guide recesses 196 of the positive mold plate 184, and the guide protrusions 194 of the positive mold plate 184 are longer than the guide protrusions 216 of the negative mold plate 208.

In one or more embodiments, the negative mold plate 208 includes cavities 220 for helping form the indicia 70 on the pressware product 10. The cavities 220 may include indentations 222 corresponding to and operable to receive the bumps 200 of the positive mold plate 184 and debossed or sunken characters 224 corresponding to and operable to receive the embossed characters 202 of the positive mold plate 184.

The negative mold block 210 is secured to the negative mold plate 208 within the cavity 212 and is operable to help form the central planar portion 48 of the product 10. In one or more embodiments, the negative mold block 210 includes protrusions 226 and/or indentations 228 complementary to corresponding indentations 206 and/or protrusions 204 of the positive mold block 188 for helping form the stacking structures 24 of the pressware product 10. The protrusions 226 and/or indentations 228 may be any shape without departing from the scope of the present invention. Similar to the positive mold plate and blocks, in one or more embodiments, the negative mold block 210 and plate 208 are an integral piece.

Figure 16:
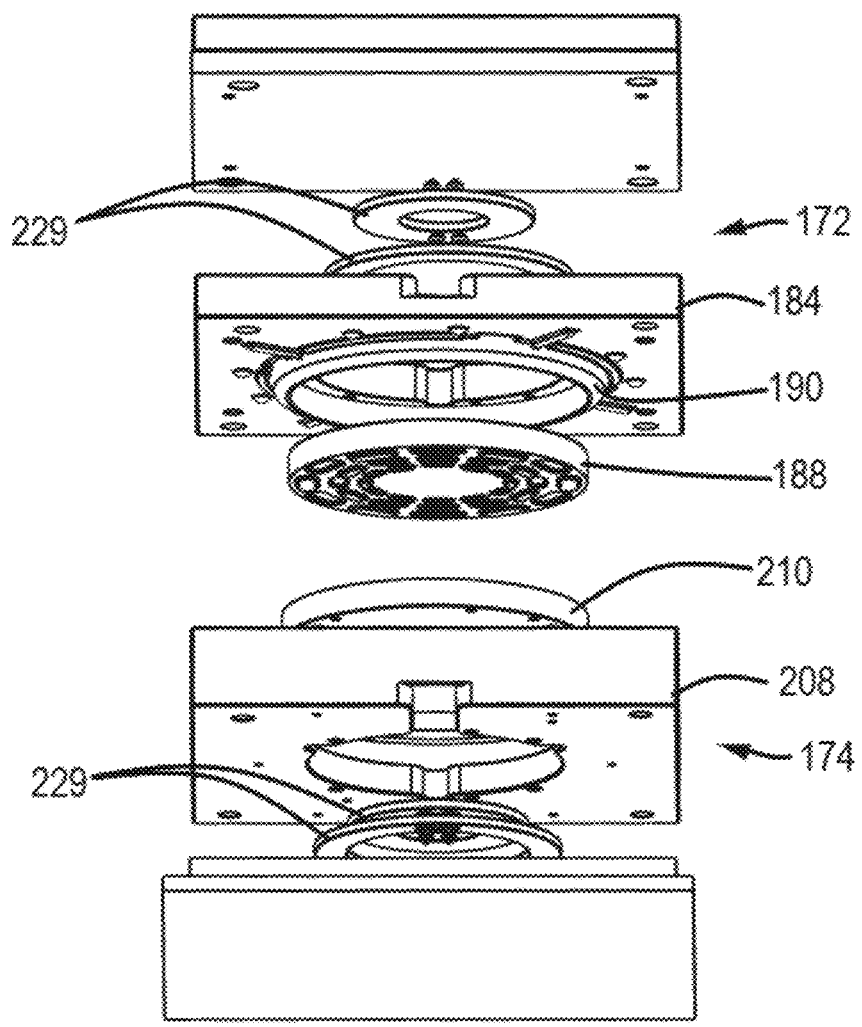
FIG. 16 is a lowered exploded view of the section of the forming tool of FIG. 13.

As depicted in FIG. 16, in one or more embodiments, the positive mold assembly 172 and/or the negative mold assembly 174 includes one or more heating elements 229 for heating their respective mold plates 184, 208 and/or mold blocks 188, 210.

Figure 17:
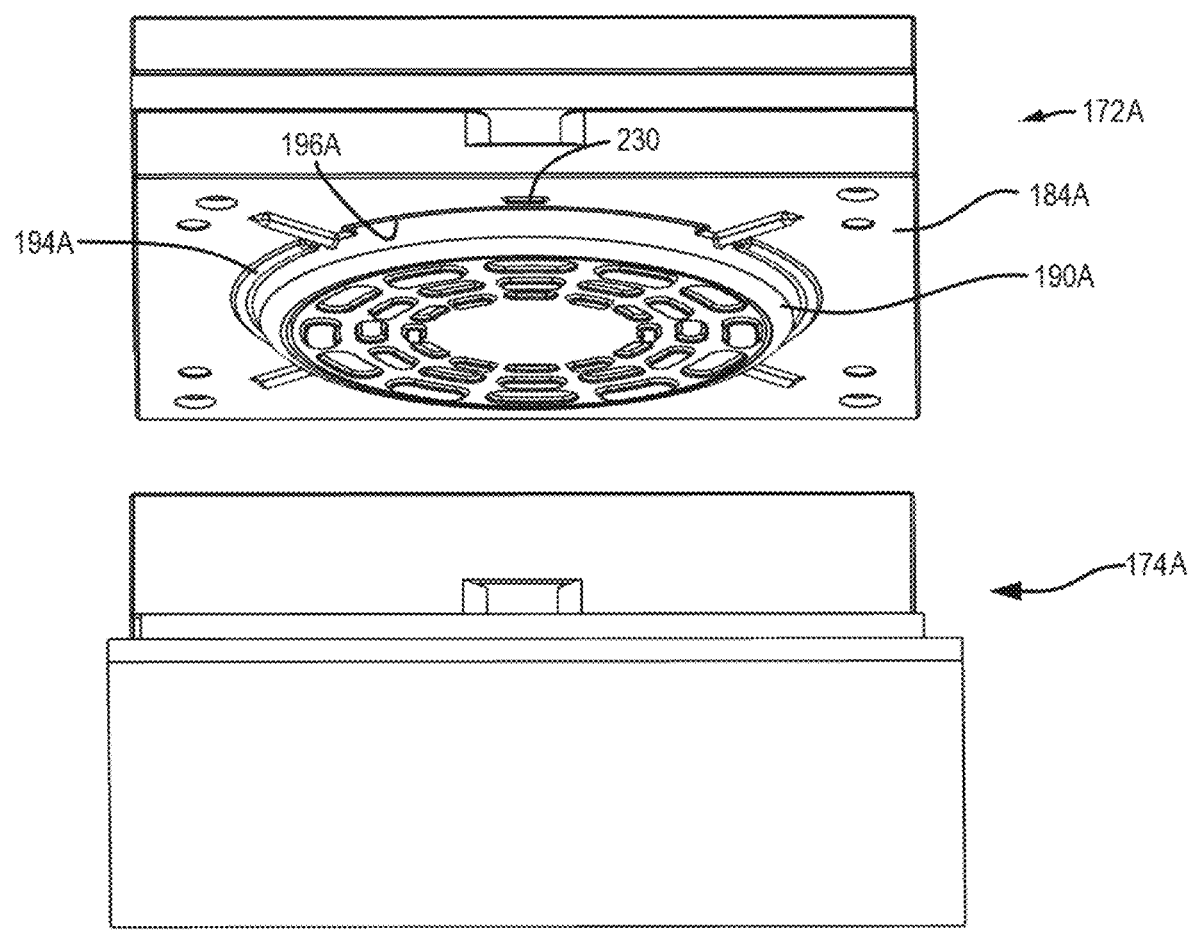
FIG. 17 is a lowered perspective view of a section of the forming tool of FIG. 13 constructed according to another embodiment of the present invention.
Figure 18:
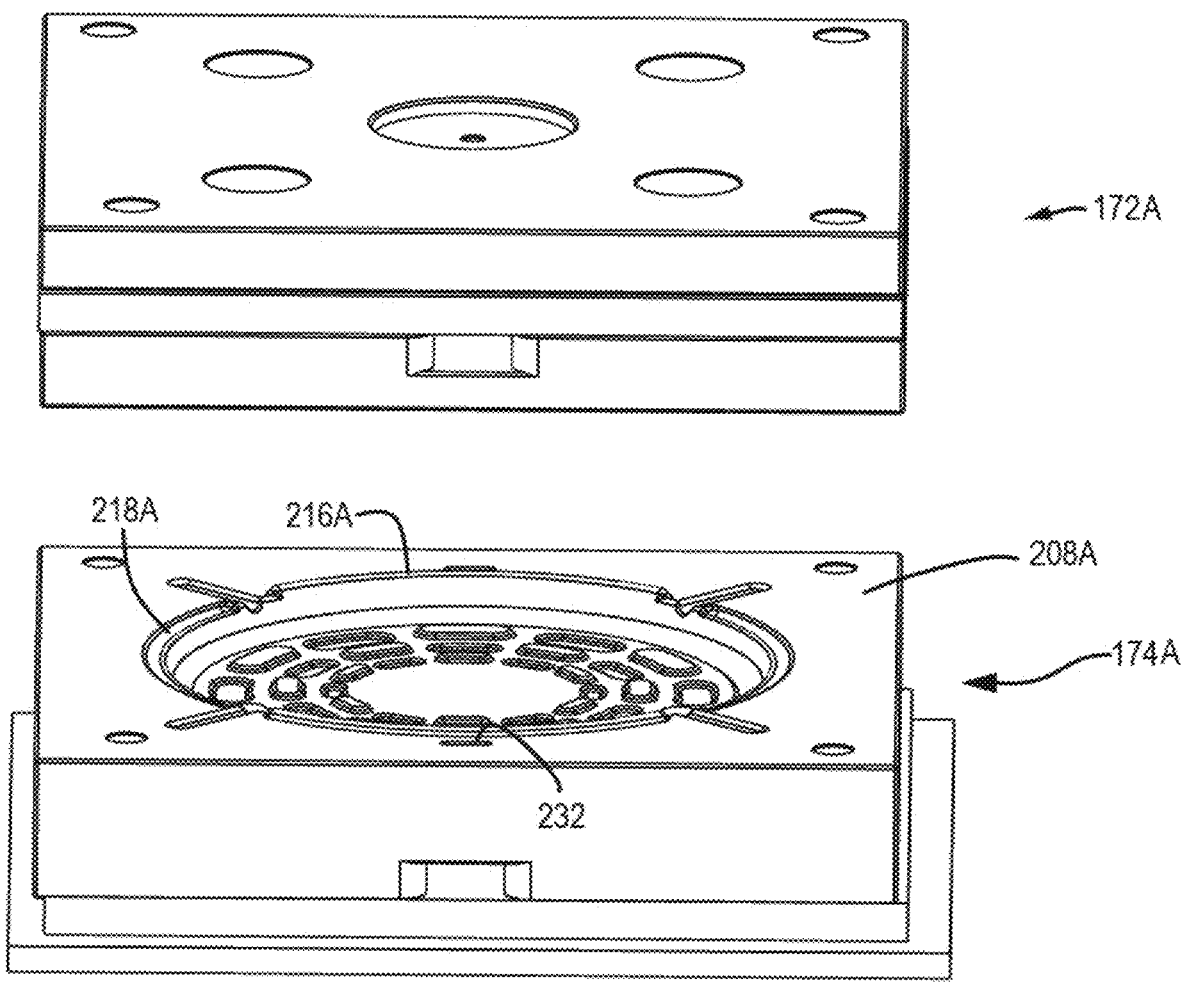
FIG. 18 is an elevated perspective view of the section of the forming tool of FIG. 17.

FIGS. 17 and 18 depict a representative section of positive and negative mold assemblies 172A, 174A according to another embodiment of the present invention. The positive and negative mold assemblies 172A, 174A comprise some similar components as positive and negative mold assemblies 172, 174; thus, the components of positive and negative mold assemblies 172A, 174A that correspond to similar components in positive and negative mold assemblies 172, 174 have an 'A' appended to their reference numerals.

The positive and negative mold assemblies 172A, 174A are substantially similar to positive and negative mold assemblies 172, 174 except that the positive mold plate 184A comprises a locking tab protrusion 230 spaced radially apart from the annular protrusion 190A (as depicted in FIG. 17), and the negative mold plate 208A includes a corresponding locking tab recess 232 operable to receive the locking tab protrusion 230. The locking tab protrusion and recess 230, 232 form the bumps 88 of the product 10A. Additionally, the guide protrusions 194A, 216A and the guide recesses 196A, 218A of the positive and negative mold plates 184A, 208A generally have the same lengths, with the guide recesses 196A, 218A being slightly larger to receive the corresponding guide protrusions 194A, 216A.

The actuator 160 is configured to shift the positive mold assembly 172, 172A and/or the negative mold assembly 174, 174A so that they compress the web 114 to shape the products 10, 10A.

Figure 19:
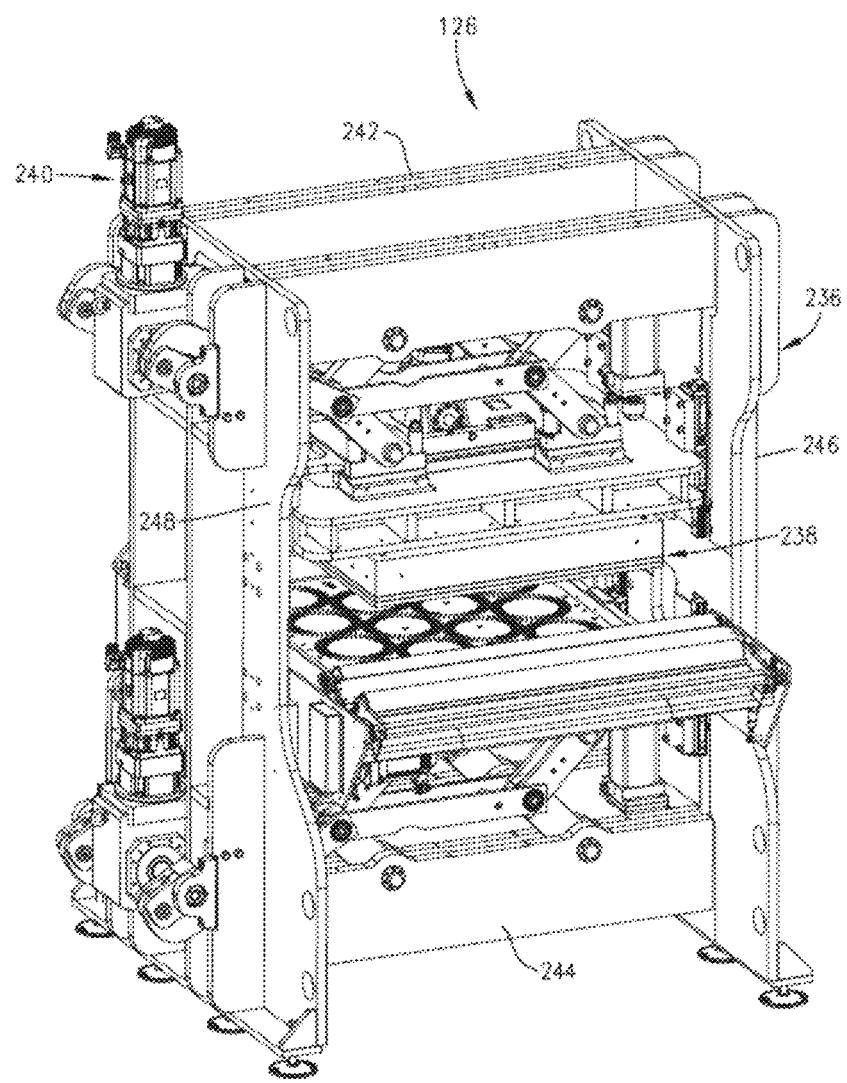
FIG. 19 is a perspective view of a scoring station of the system of FIG. 9.

Turning to FIG. 19, the scoring station 126 is configured to receive the web 114 with the products 10, 10A formed therein and make one or more slits in the web 114 for forming the slots 32, 32A and/or flaps 34, 34A. The scoring station 126 may comprise a scoring station frame 236, a scoring tool 238, and a scoring station actuator 240. The scoring station frame 236 is configured to support the scoring tool 238 and the scoring station actuator 240. The frame 236 may include an upper gantry 242 and a lower gantry 244 for supporting different portions of the scoring tool 238 and the scoring station actuator 240. The frame 236 may also include upright supports 246, 248 for supporting the gantries 242, 244. The upright supports 246, 248 may include one or more tracks for guiding the scoring tool 238 and or portions of the actuator 240.

Figure 20:
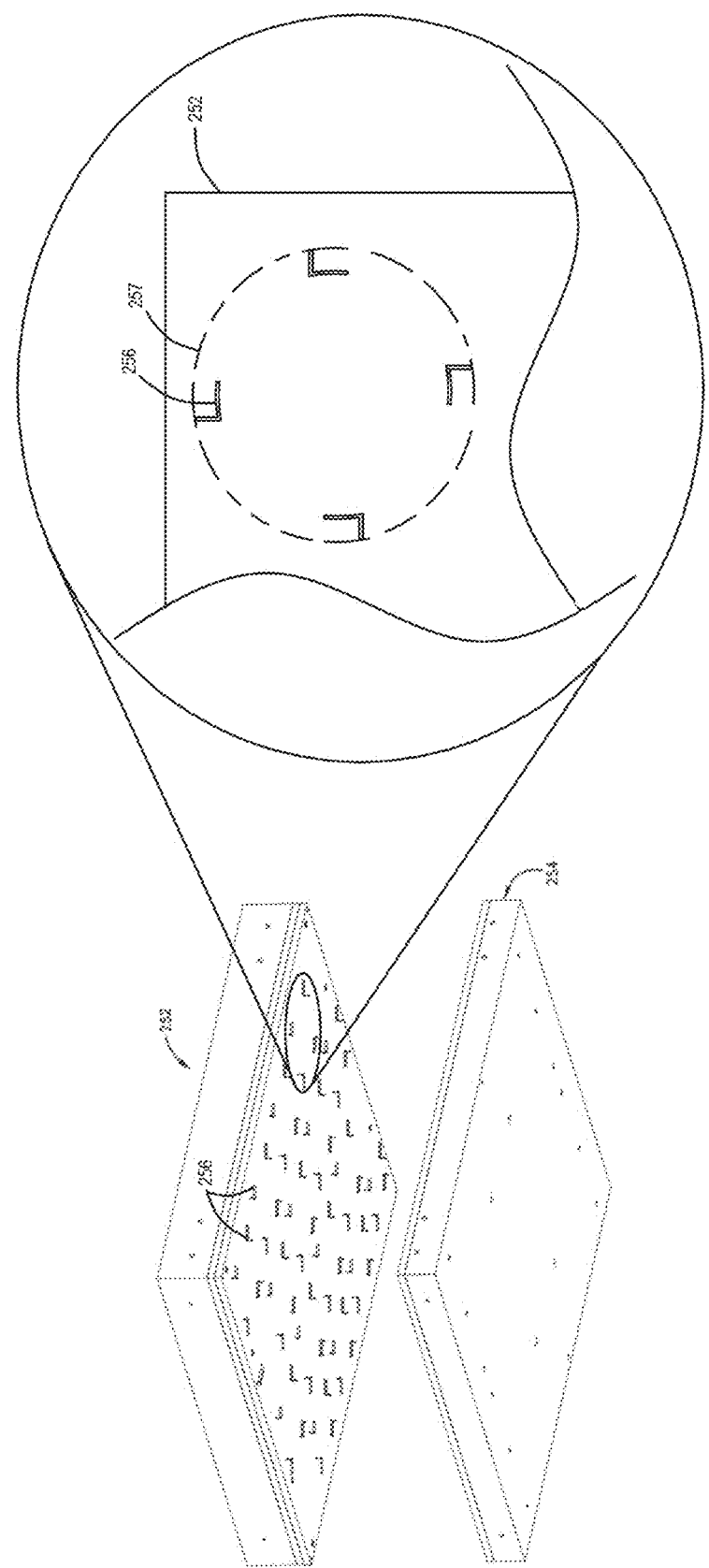
FIG. 20 is a lowered perspective view of a scoring tool of the scoring station of FIG. 19 with an enlarged view of a portion of a top scoring tool.
Figure 21:
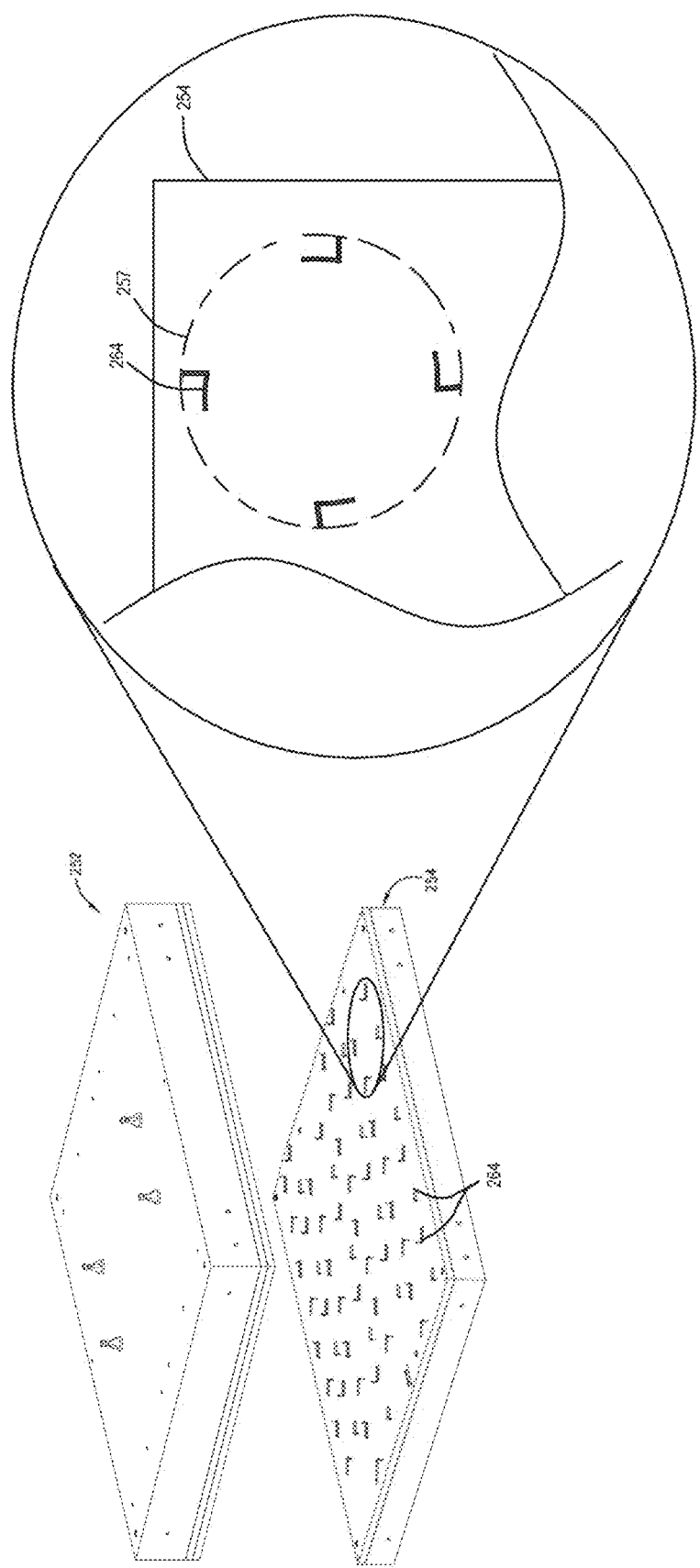
FIG. 21 is an elevated perspective view of the scoring tool of the scoring station of FIG. 19 with an enlarged view of a portion of a bottom scoring tool.

Turning to FIGS. 20 and 21, the scoring tool 238 is configured to be actuated to form slits about the products 10, 10A. The scoring tool 238 may include a top scoring tool 252 and a bottom scoring tool 254. While FIGS. 20 and 21 depict the tools 252, 254 having match metal trim components, the tools 252, 254 may comprise alternative components without departing from the scope of the present invention, such as a knife or blade tool and a striker plate. Further, either of the tools 252, 254 may comprise positive components extending therefrom (such as a punch or knife), negative components (such as female components or a strike plate), and/or both types of components.

Turning to FIG. 20, the top scoring tool 252 comprises one or more protrusions with edges 256 for forming the slits in the web 114 about the formed part. In one or more embodiments, each edge 256 extends along a path to form only a portion of the slots 32 and/or flaps 34. For example, FIG. 20 depicts a schematic diagram representing a section of the top scoring tool 252 with a representative set of edges 256. The edges 256 comprise L-shaped punches that help form the slot 32 and/or the flap 34 when the product 10 is trimmed at the trimming station. The dotted line 257 schematically represents the perimeter of the product 10 projected onto the section of the top scoring tool 252. The edges 256 may extend along paths forming any number of shapes without departing from the scope of the present invention. For example, each of the edges 256 may extend along a continuous path to form an open-ended shape with a first end of the open-ended shape having an opening and a second end of the open-ended shape circumferentially spaced apart from the first end about the formed shape of the product 10 to help form the slot 32 and/or flap 34 so that the trimming tool is not relied upon for forming the flaps or slots. The edges 256 may be positioned to form the flaps or slots at any position on the flange 20 and with any orientation (i.e., so that the flaps or slots extend at any angle relative to a radius of the flange 20) without departing from the scope of the present invention. Additionally, one or more of the edges 256 may form different paths to facilitate creation of differently shaped flaps.

Turning to FIG. 21, the bottom scoring tool 254 includes one or more recesses for receiving the protrusions of the top scoring tool 252. The recesses include one or more edges 264 corresponding to the edges 256 of the top scoring tool 252 to help form the one or more slits in the web 114 to facilitate the formation of the slots 32 and/or the flaps 34.

Figure 22:
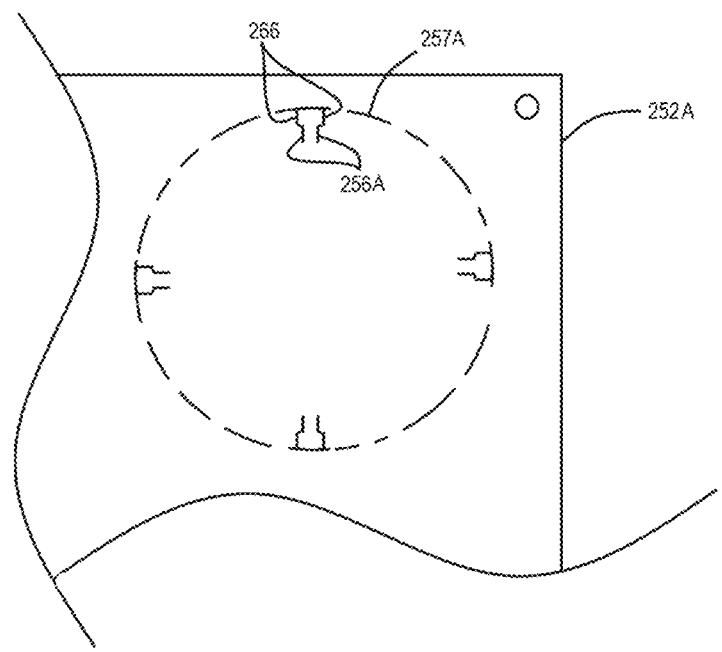
FIG. 22 is an enlarged view of a portion of the top scoring tool of the scoring station of FIG. 19 constructed according to another embodiment of the invention.
Figure 23:
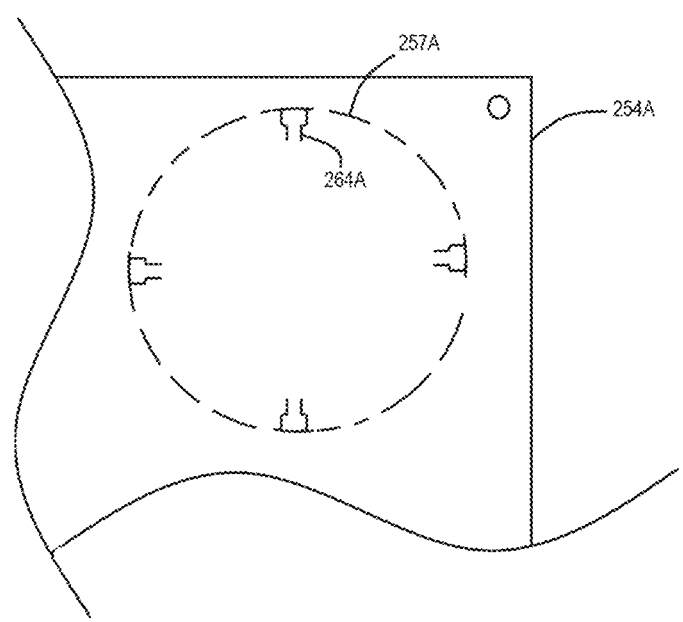
FIG. 23 is an enlarged view of a portion of the bottom scoring tool corresponding to the top scoring tool of FIG. 22.

FIGS. 22 and 23 depict exemplary portions of the top and bottom scoring tools 252A, 254A according to another embodiment of the present invention. The top and bottom scoring tools 252A, 254A comprise some similar components; thus, the components that correspond to similar components have an 'A' appended to their reference numerals.

The top and bottom scoring tools 252A, 254A depicted in FIGS. 22 and 23 are substantially similar except that the one or more edges 256A for forming the slits in the web 114 about the formed tool extend along paths corresponding to the radially extending tab 32A. Further, the edges 256A include one or more transversely extending portions 266 for helping form the outwardly extend tabs 90 of the product 10A. The edges 264A of the bottom scoring tool 254A correspond to and are shaped to at least partially receive the edges 256A of the top scoring tool 252A.

The actuator 240 is configured to shift at least one of the scoring tools 252, 252A, 254, 254A so that the top scoring edges 256, 256A and corresponding bottom scoring edges 264, 264A pinch the web 114 to form slits therein for facilitating the creation of the slots 32, 32A and/or the flaps 34, 34A.

Figure 24:
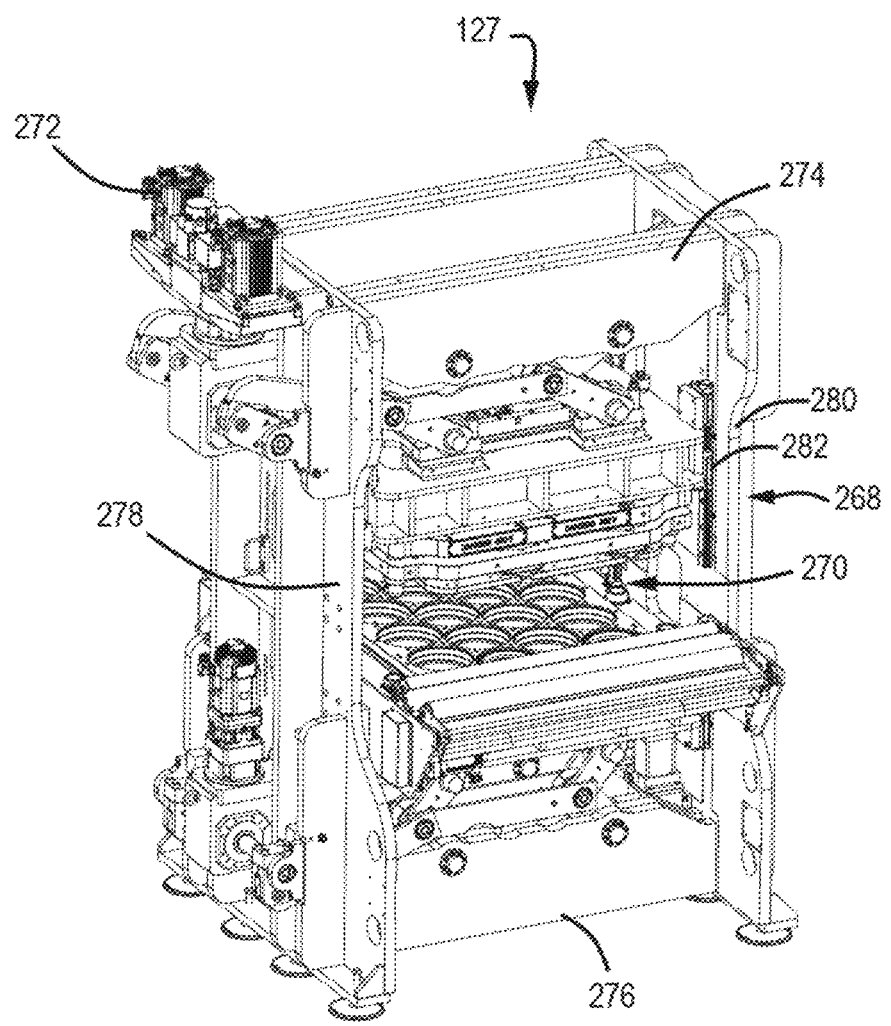
FIG. 24 is a perspective view of a trimming station of the system of FIG. 9.

Turning to FIG. 24, the trimming station 127 is configured to receive the web 114 with the products 10, 10A formed therein and trim the products 10, 10A from the web 114. The trimming station 127 may comprise a trimming station frame 268, a trimming tool 270, and one or more trimming station actuator 272. The trimming station frame 268 is configured to support the trimming tool 270 and the trimming station actuator 272. The frame 268 may include an upper gantry 274 and a lower gantry 276 for supporting different portions of the trimming tool 270 and the trimming station actuator 272. The frame 268 may also include upright supports 278, 280 for supporting the gantries 274, 276. The upright supports 278, 280 may include one or more tracks 282 for guiding the trimming tool 270 and or portions of the actuator 272.

Figure 25:
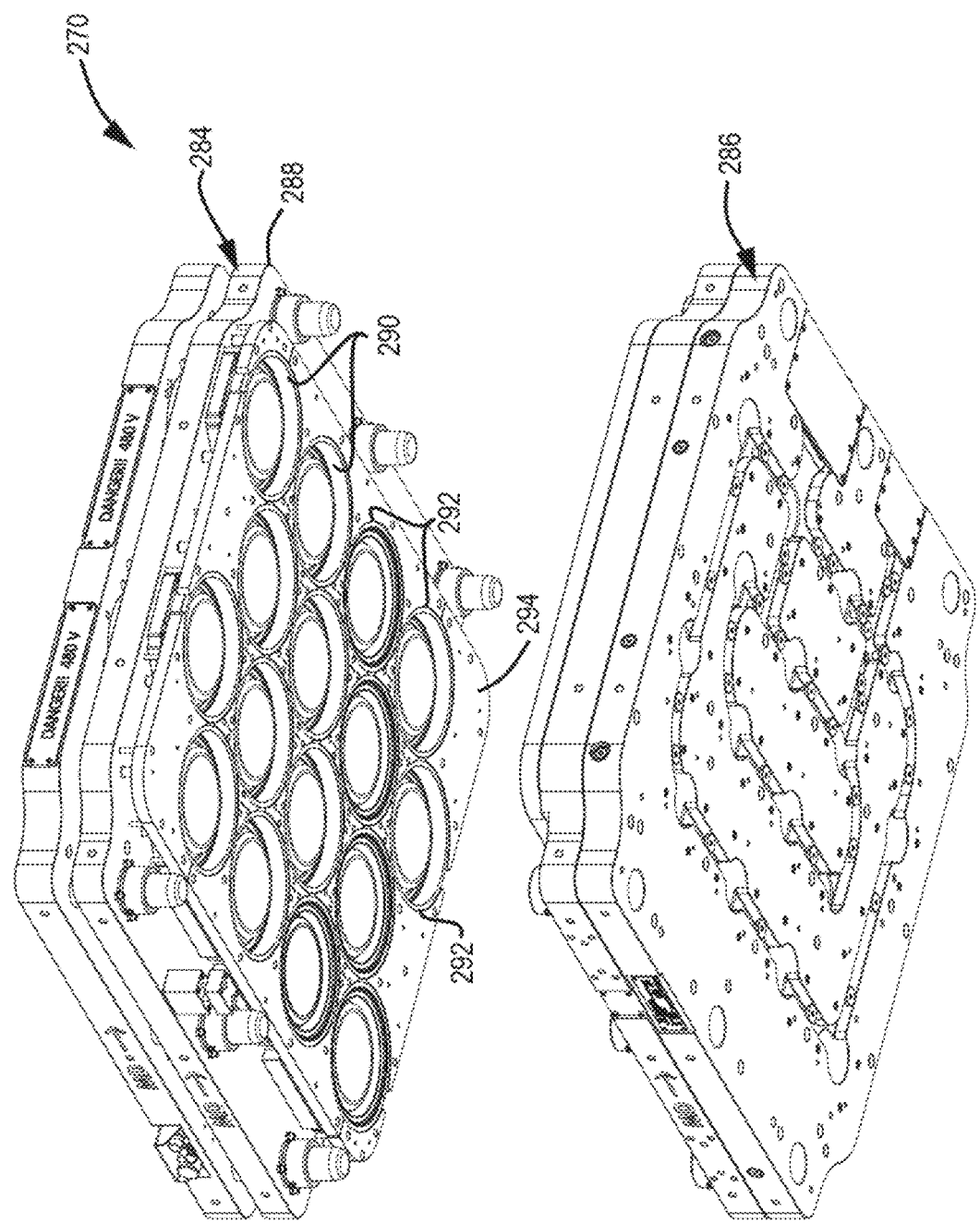
FIG. 25 is a lowered perspective view of a trimming tool of the trimming station of FIG. 24.

Turning to FIG. 25, the trimming tool 270 is configured to be actuated to cut the products 10, 10A from the web 114 and comprises a top tool 284 and a bottom tool 286. The top tool 284 includes a punch shoe 288 and a plurality of punches 290. The punch shoe 288 supports the punches 290. The punches 290 include edges 292, such as the outer edges of the punches 290, configured to cut the products 10, 10A from the web 114. The top tool 284 may also include a trim stripper 294 for pushing the scrap web 114 away from the top tool 284.

Figure 26:
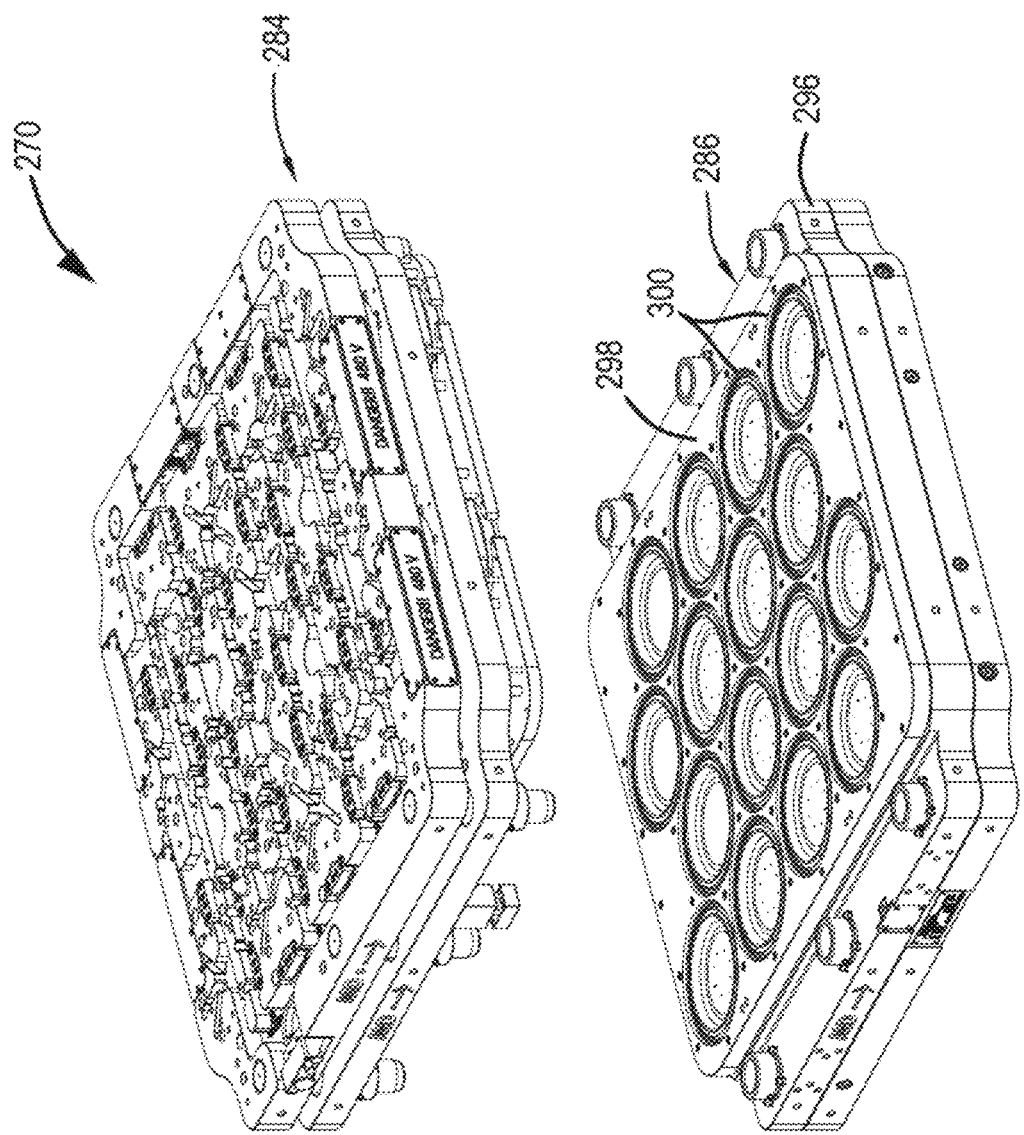
FIG. 26 is an elevated perspective view of the trimming tool of FIG. 25.

Turning to FIG. 26, the bottom tool 286 may include a die shoe 296 and a trim die 298. The die shoe 296 supports the trim die 298, which includes edges 300 that help pinch the web 114 with the punches 290 to remove the products 10, 10A from the web 114. The trimming station actuator 272 is configured to actuate the trimming tool 270 so that the punches 290 and corresponding edges 300 cut the products 10, 10A from the web 114.

Figure 27:
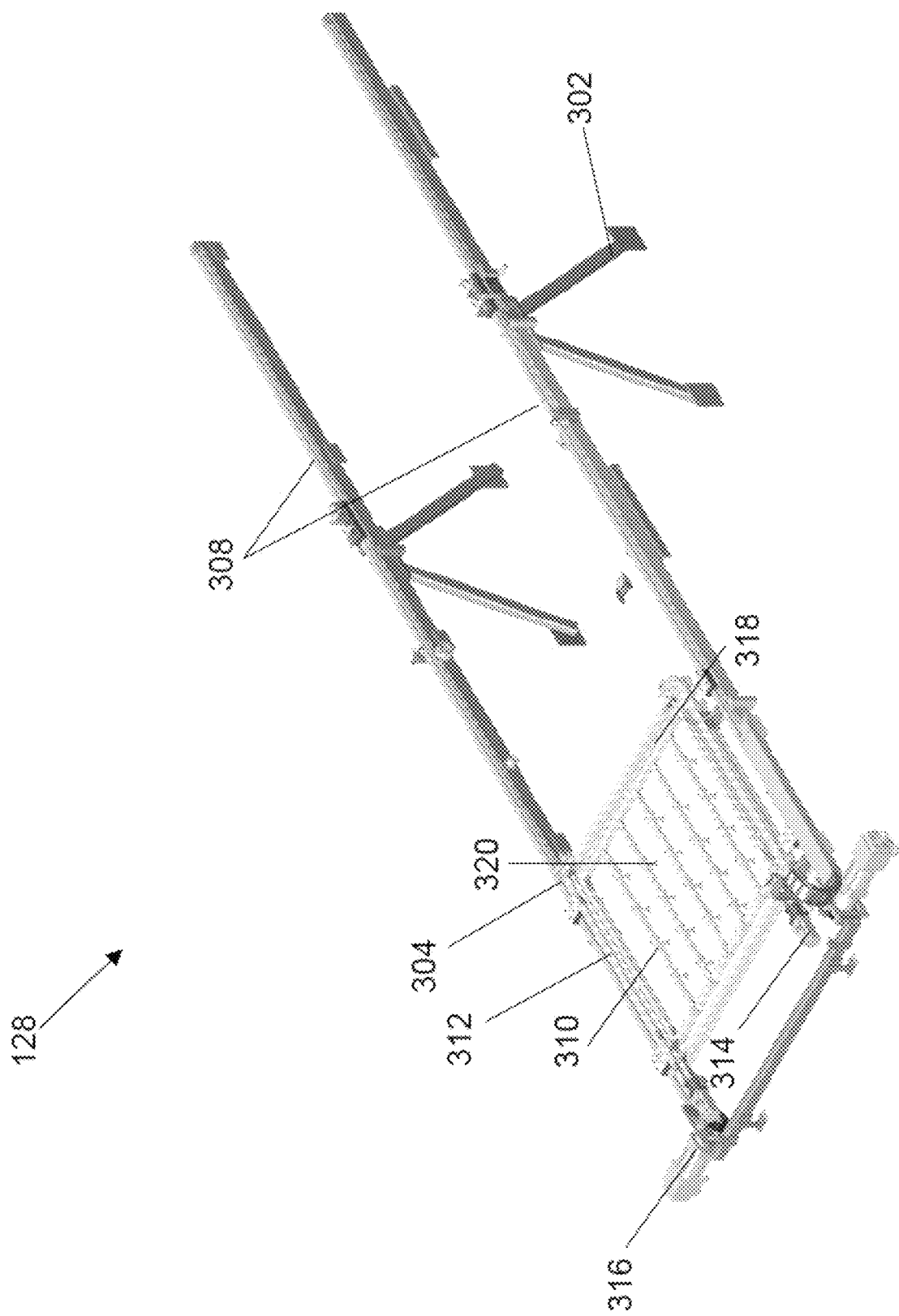
FIG. 27 is an elevated perspective view of a picking station of the system of FIG. 9.

Turning to FIG. 27, the picking station 128 may include a frame 302 and a pressware extractor assembly 304. The frame 302 may be adjacent to the trimming station 127 so that the picking station 128 can access the products 10, 10A cut at the trimming station 127.

Turning briefly back to FIG. 9, the picking station 128 is configured to pick the products 10, 10A from the trimming station 127. A conveyor may be positioned below transport rails supported on the frame 302 and configured to transport the products 10, 10A dropped by the extractor assembly 304 to the stacking station 130. The stacking station 130 may include a transverse conveyor that receives rows of the products 10, 10A from the conveyor extending under the picking station 128 and transports each row transversely to a bin (not shown) causing the rows of products 10, 10A to stack in the bin.

Turning back to FIG. 27, the pressware extractor assembly 304 is configured to move thermoformed products from the trimming station 127 and broadly includes elongated transport rails 308, a first car 310, a second car 312, a powered drive mechanism 314, and a powered lateral drive mechanism 316. The first car 310 includes a first car frame 318 and an extractor element 320 operable to releasably hold the pressware product 10, 10A. The second car 312 is slidably supported by the rail 308 to slide laterally relative to the rail 308 along the lateral rail axis 308, with the first car 310 being supported to slide laterally with the second car 312. The powered drive mechanism 314 shiftably supports the first car 310 relative to the second car 312 for vertical movement of the extractor elements 320 relative to the trimming station 127. The powered drive mechanism 314 is configured to shift the first car 310 between a lowered position, in which the extractor elements 320 are positioned to engage the pressware products 10, 10A positioned in the trimming station 127, and a raised position, in which the pressware products 10, 10A are lifted by the extractor elements 320 out of engagement with the trimming station 127. The lateral drive mechanism 316 is operably associated with the second car 312 and the transport rails 308 and is configured to drive the second car 312 along the lateral rail axis. Additional preferred details of the aforementioned stations are disclosed in U.S. Application No. 63/494,405, filed on Apr. 5, 2023, entitled LOW PROFILE PRODUCT EXTRACTOR FOR THERMOFORMED PRODUCTS, which is hereby incorporated in its entirety by reference herein.

With reference to FIG. 10, various components of the system 110 may be controlled by and/or in communication with the control system 134. The control system 134 may comprise processors, microprocessors (single-core and multi-core), microcontrollers, DSPs, field-programmable gate arrays (FPGAs), analog and/or digital application-specific integrated circuits (ASICs), or the like, or combinations thereof. The control system 134 may be in communication with the actuators, motors, and/or other components or sensors of the various stations.

Figure 28:
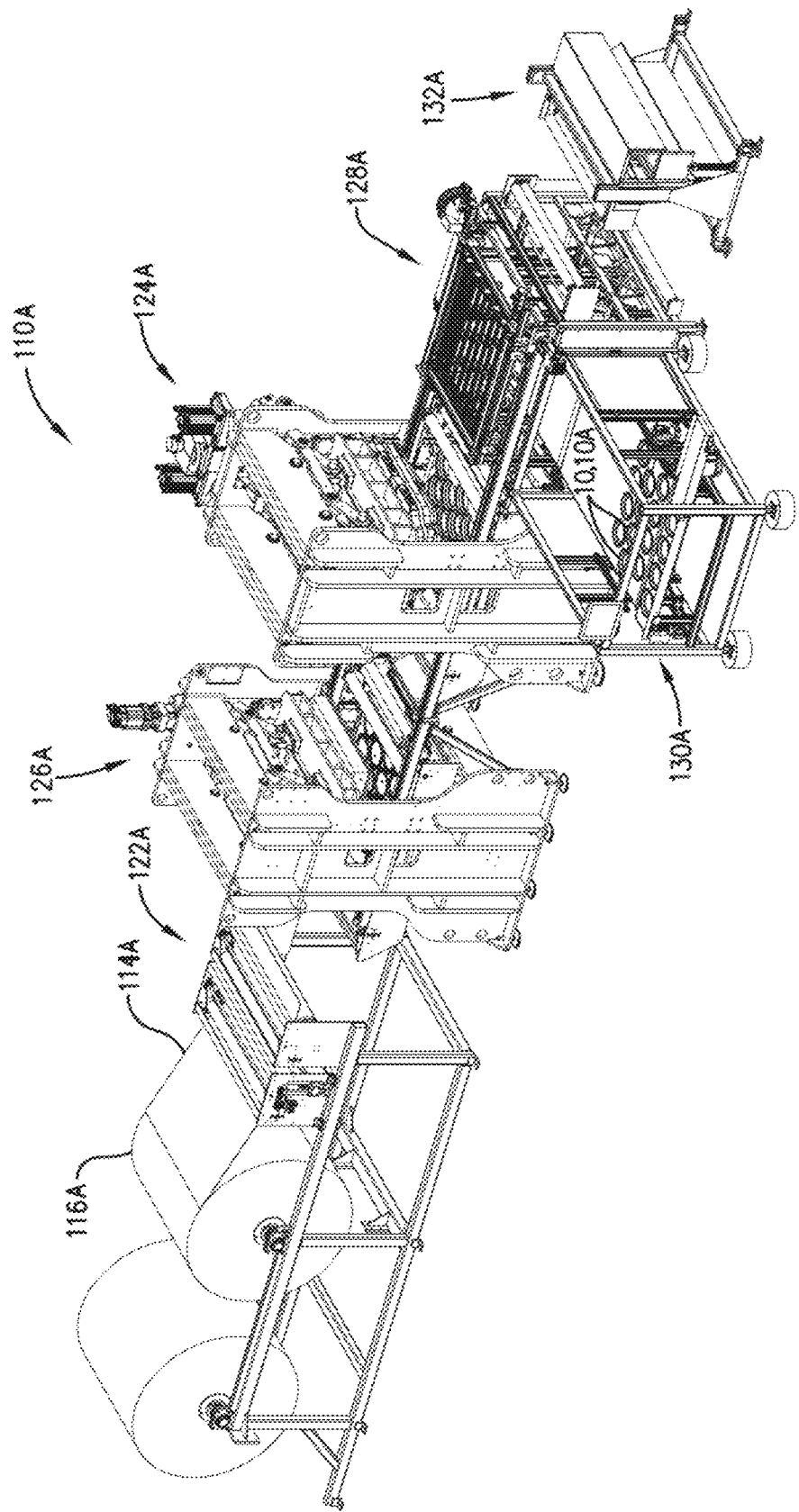
FIG. 28 is a perspective view of a system constructed according to another embodiment of the present invention.

FIG. 28 depicts a system 110A according to another embodiment of the present invention. The system 110A comprises some similar components as system 110; thus, the components of system 110A that correspond to similar components in system 110 have an 'A' appended to their reference numerals.

The system 110A is substantially similar to system 110 except that the slits for forming the slots 32, 32A and/or the flaps 34, 34A are formed at the scoring station 126A prior to formation of the products 10, 10A at the forming station 124A, the trimming is performed at the forming station 124A, the trimming station 127 is omitted, and the picking station 128A pulls products 10, 10A directly from the forming station 124A.

Figure 29:
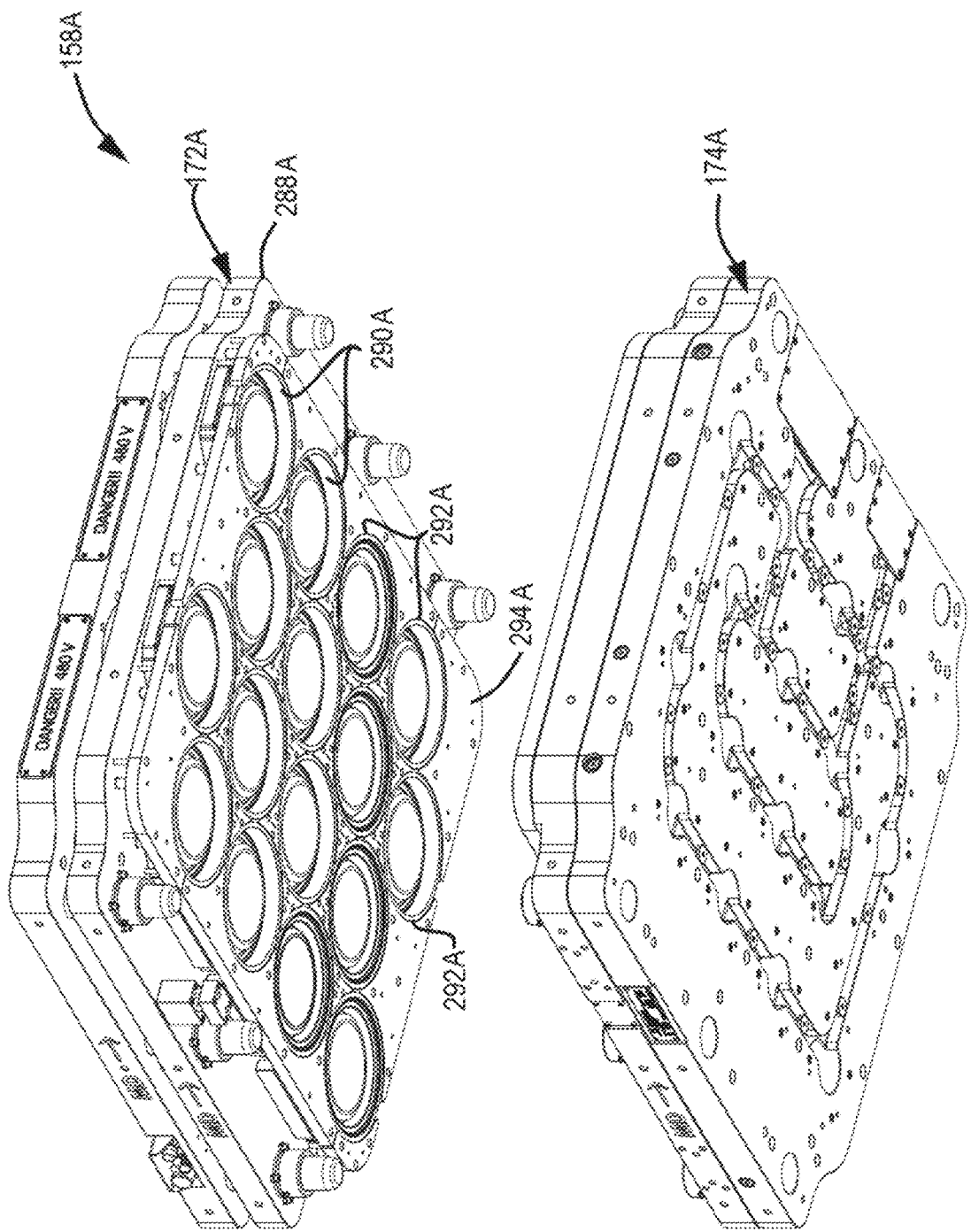
FIG. 29 is a lowered perspective view of a forming tool of a forming station of the system of FIG. 28.

Turning to FIG. 29, the positive mold assembly 172A of the forming tool 158A of the forming station 124A further comprises a punch shoe 288A and a plurality of punches 290A. The punch shoe 288A supports the punches 290A. The punches 290A include edges 292A configured to cut the products 10, 10A from the web 114. The top tool 284A may also include a trim stripper 294A for pushing the scrap web 114 away from the top tool 284A.

Figure 30:
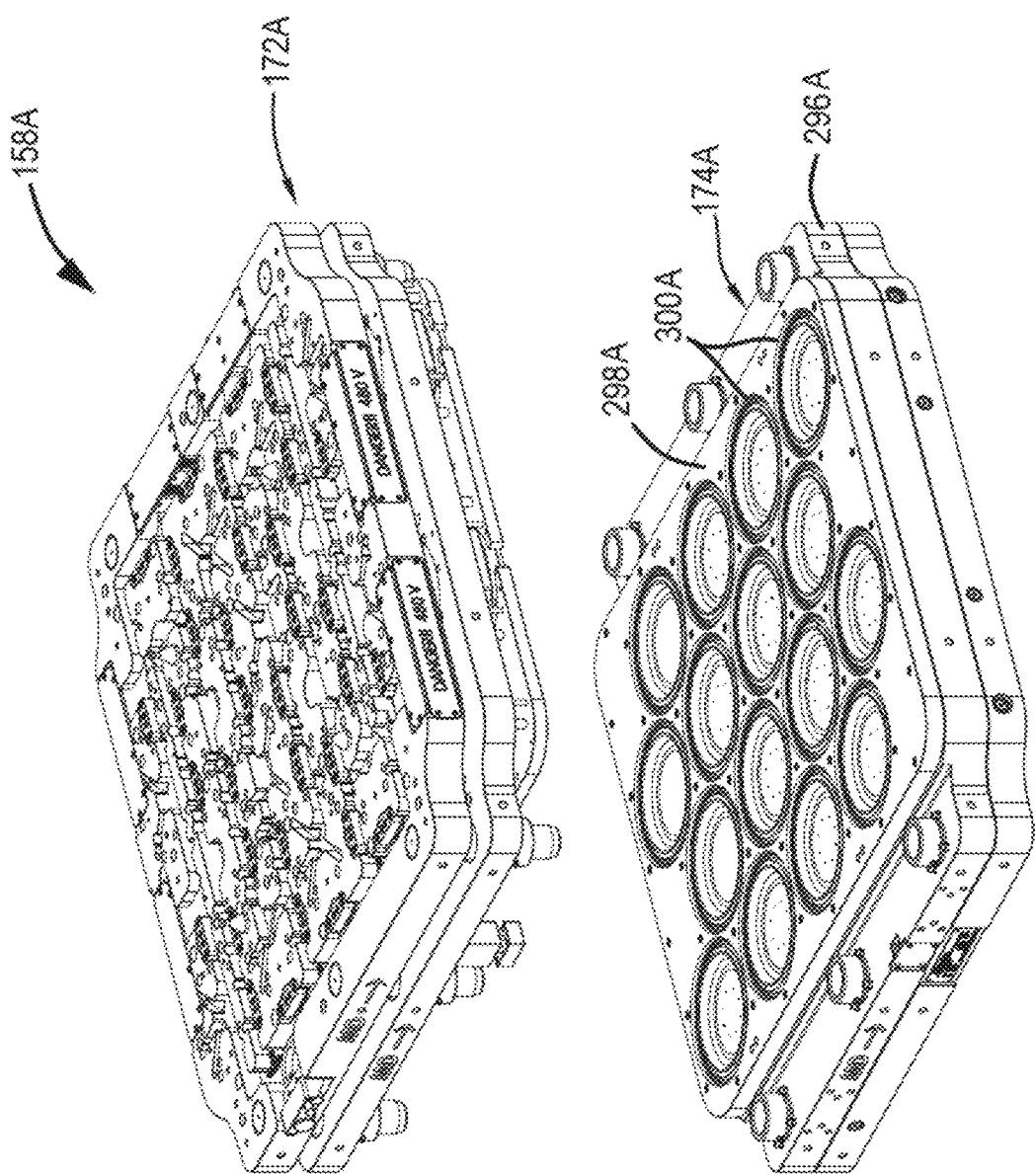
FIG. 30 is an elevated perspective view of the forming tool of FIG. 29.

Turning to FIG. 30, the negative mold assembly 174A of the forming tool 158A also includes a die shoe 296A and a trim die 298A. The die shoe 296A supports the trim die 298A, which includes edges 300A that help pinch the web 114 with the punches 290A to remove the products 10, 10A from the web 114. When the forming station actuator actuates the forming tools, the punches 290A and corresponding edges 300A cut the products 10, 10A from the web 114 as the products 10, 10A are being formed. The picking station 128A extends into the forming station 124A to pick the formed and trimmed products 10, 10A from the forming station.

Figure 31:
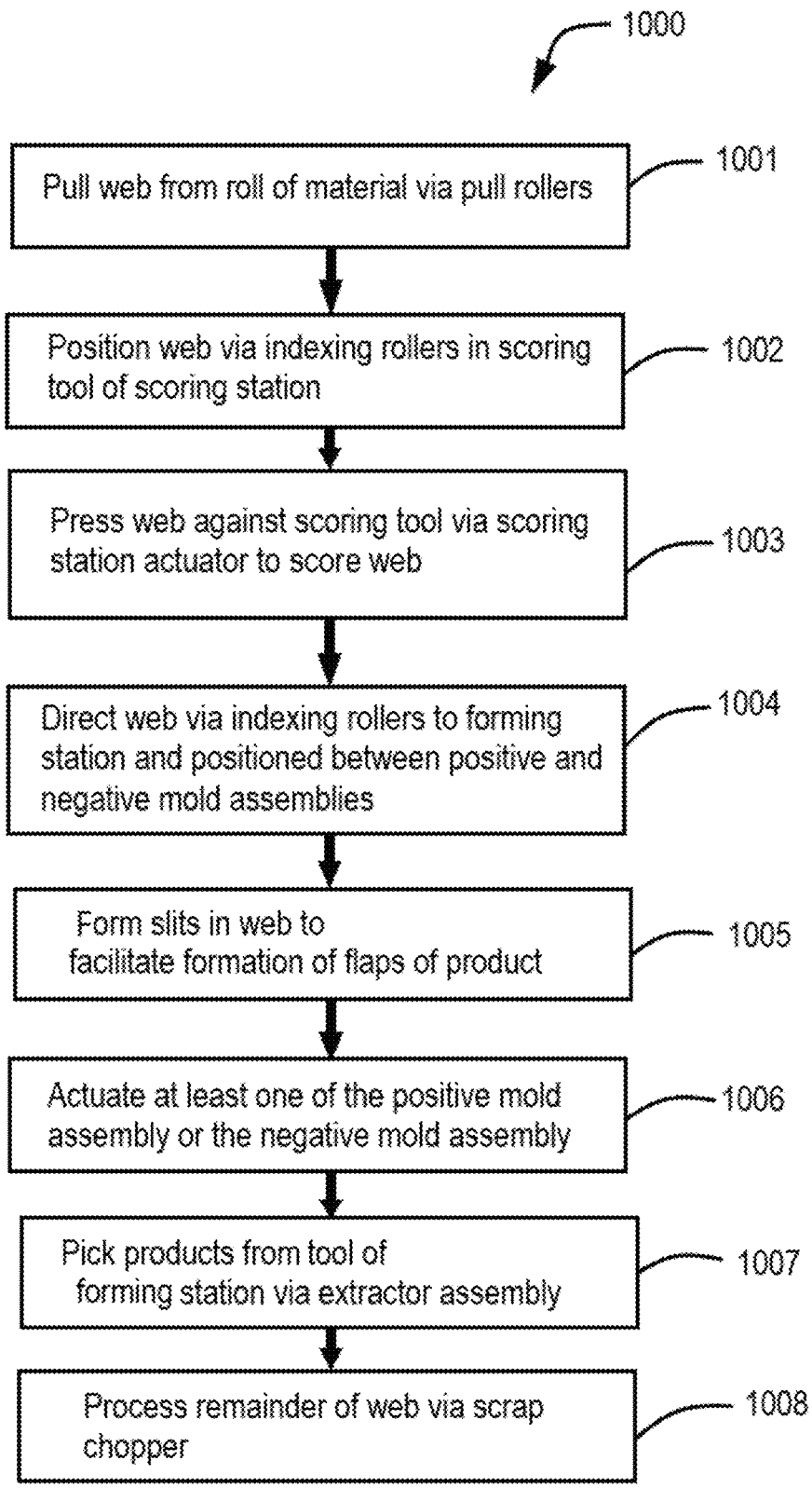
FIG. 31 is a flowchart depicting exemplary steps of a method according to an embodiment of the present invention.

The flow chart of FIG. 31 depicts the steps of an exemplary method 1000 of forming pressware products. In some alternative implementations, the functions noted in the various blocks may occur out of the order depicted in FIG. 31. For example, two blocks shown in succession in FIG. 31 may in fact be executed substantially concurrently, or the blocks may sometimes be executed in the reverse order depending upon the functionality involved. In addition, some steps may be optional.

The method 1000 is described below, for ease of reference, as being executed by exemplary devices and components introduced with the embodiments illustrated in FIGS. 9-27. The steps of the method 1000 may be performed by the control system 134 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 1001, a web may be pulled from a roll of material via pull rollers driven by decurling station motors. The pull rollers may be part of an assembly that includes pinch rollers biased against the pull rollers that cause the pull rollers to grip the web. This step may include capturing data associated with the roll of material and adjusting the decurling station rollers accordingly.

Referring to step 1002, the web is positioned, via one or more indexing rollers, between the scoring tool of the scoring station.

Referring to step 1003, the web is pressed by a scoring tool via a scoring station actuator Referring to step 1004, the web is directed, via one or more indexing rollers, to the forming station and positioned between the positive mold assembly and the negative mold assembly. The mold plate of the positive mold assembly may include a plurality of the annular protrusions, and the assembly may include a plurality of the positive mold blocks for forming several products simultaneously. Likewise, the negative mold assembly may include a mold plate with a plurality of the cavities and a plurality of the negative mold blocks.

Referring to step 1005, slits may be formed in the web to facilitate formation of the flaps and/or slots. This step may be performed along the entire outline of the flap and/or along only portions of the outline of the flap so that the flap can be broken free for operation by a user. This step may be performed via actuation of at least one of the positive and negative mold assemblies (see next step) or via a separate mechanism before or after actuation of the at least one of the positive and negative mold assemblies.

Referring to step 1006, the positive and negative mold assemblies are actuated via the forming station actuator. The web is compressed between the positive and negative mold plates and the positive and negative mold blocks, thereby forming the central portions, side walls, and portions of the flanges of the products. This step may also include forming the stacking structure, grooves for the vent channels, the indicia and/or bumps, the guides, the guide grooves, and/or the bumps for catching corresponding flaps. This step may include heating the web via the heating elements of the forming station.

Referring to step 1007, the formed products are picked via the extractor assembly. This step may include transporting the products via the conveyor beneath the extractor assembly to the transverse conveyor. The transverse conveyor may receive rows of the products and then transport them transverse to the picker conveyor to stack each row. This step may include stacking the products via the transverse conveyor.

Referring to step 1008, the scrap web may be cut via the scrap chopper. This step may include guiding the scrap web to a chopping station via one or more indexers of the picking station and/or the chopping station. The scrap web is then loaded into the scrap chopper, which includes one or more edges, blades, knives, or the like operable to cut the scrap web.

The method 1000 may include additional, less, or alternate steps and/or device(s), including those discussed elsewhere herein.

Figure 32:
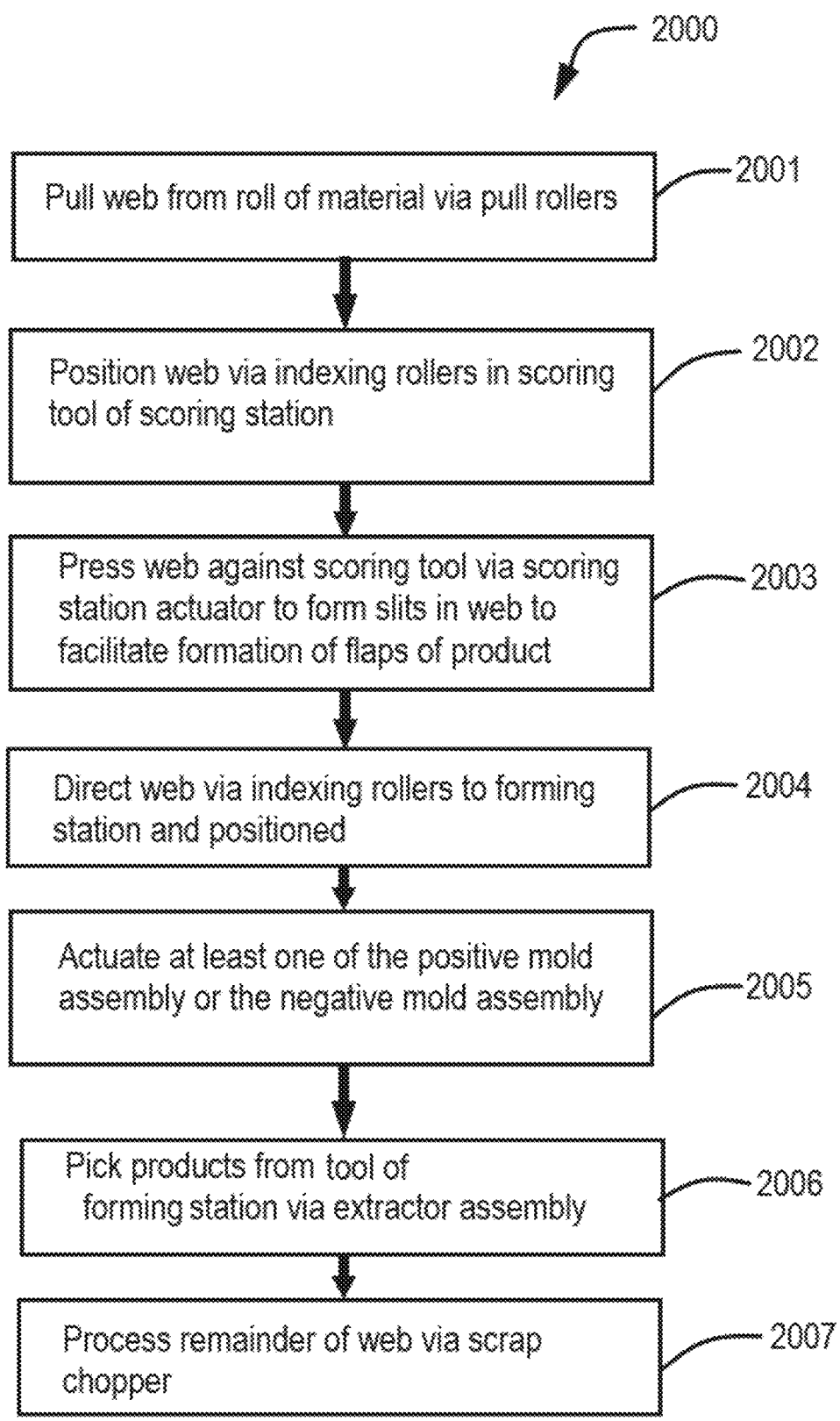
FIG. 32 is a flowchart depicting exemplary steps of a method according to another embodiment of the present invention.

The flow chart of FIG. 32 depicts the steps of an exemplary method 2000 of forming pressware products. In some alternative implementations, the functions noted in the various blocks may occur out of the order depicted in FIG. 32. For example, two blocks shown in succession in FIG. 32 may in fact be executed substantially concurrently, or the blocks may sometimes be executed in the reverse order depending upon the functionality involved. In addition, some steps may be optional.

The method 2000 is described below, for ease of reference, as being executed by exemplary devices and components introduced with the embodiments illustrated in FIGS. 28-30. The steps of the method 2000 may be performed by the control system thereof through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 2001, a web may be pulled from a roll of material via pull rollers driven by decurling station motors. The pull rollers may be part of an assembly that includes pinch rollers biased against the pull rollers that cause the pull rollers to grip the web. This step may include capturing data associated with the roll of material and adjusting the decurling station rollers accordingly.

Referring to step 2002, the web is directed, via one or more indexing rollers, to the scoring tool of the scoring station.

Referring to step 2003, the web is pressed by a scoring tool via a scoring station actuator to form one or more slits in the web to facilitate formation of the flaps and/or slots. This step may include scoring the web to along the entire outline of the flap and/or along only portions of the outline of the flap so that the flap can be broken free for operation by a user.

Referring to step 2004, the web is positioned, via one or more indexing rollers, to the forming station and positioned between the positive mold assembly and the negative mold assembly. The mold plate of the positive mold assembly may include a plurality of the annular protrusions, and the assembly may include a plurality of the positive mold blocks for forming several products simultaneously. Likewise, the negative mold assembly may include a mold plate with a plurality of the cavities and a plurality of the negative mold blocks.

Referring to step 2005, the positive and negative mold assemblies are actuated via the forming station actuator. The web is compressed between the positive and negative mold plates and the positive and negative mold blocks, thereby forming the central portions, side walls, and portions of the flanges of the products. This step may also include forming the stacking structure, grooves for the vent channels, the indicia and/or bumps, the guides, the guide grooves, and/or the bumps for catching corresponding flaps. This step may include heating the web via the heating elements of the forming station. This step may include trimming the products from the web via the edges of the punches and the trim die of the positive and negative mold assemblies.

Referring to step 2006, the formed products are picked via the extractor assembly. This step may include transporting the products via the conveyor beneath the extractor assembly to the transverse conveyor. The transverse conveyor may receive rows of the products and then transport them transverse to the picker conveyor to stack each row. This step may include stacking the products via the transverse conveyor.

Referring to step 2007, the scrap web may be cut via the scrap chopper. This step may include guiding the scrap web to a chopping station via one or more indexers of the picking station and/or the chopping station. The scrap web is then loaded into the scrap chopper, which includes one or more edges, blades, knives, or the like operable to cut the scrap web.

The method 1000 may include additional, less, or alternate steps and/or device(s), including those discussed elsewhere herein.

Figure 33:
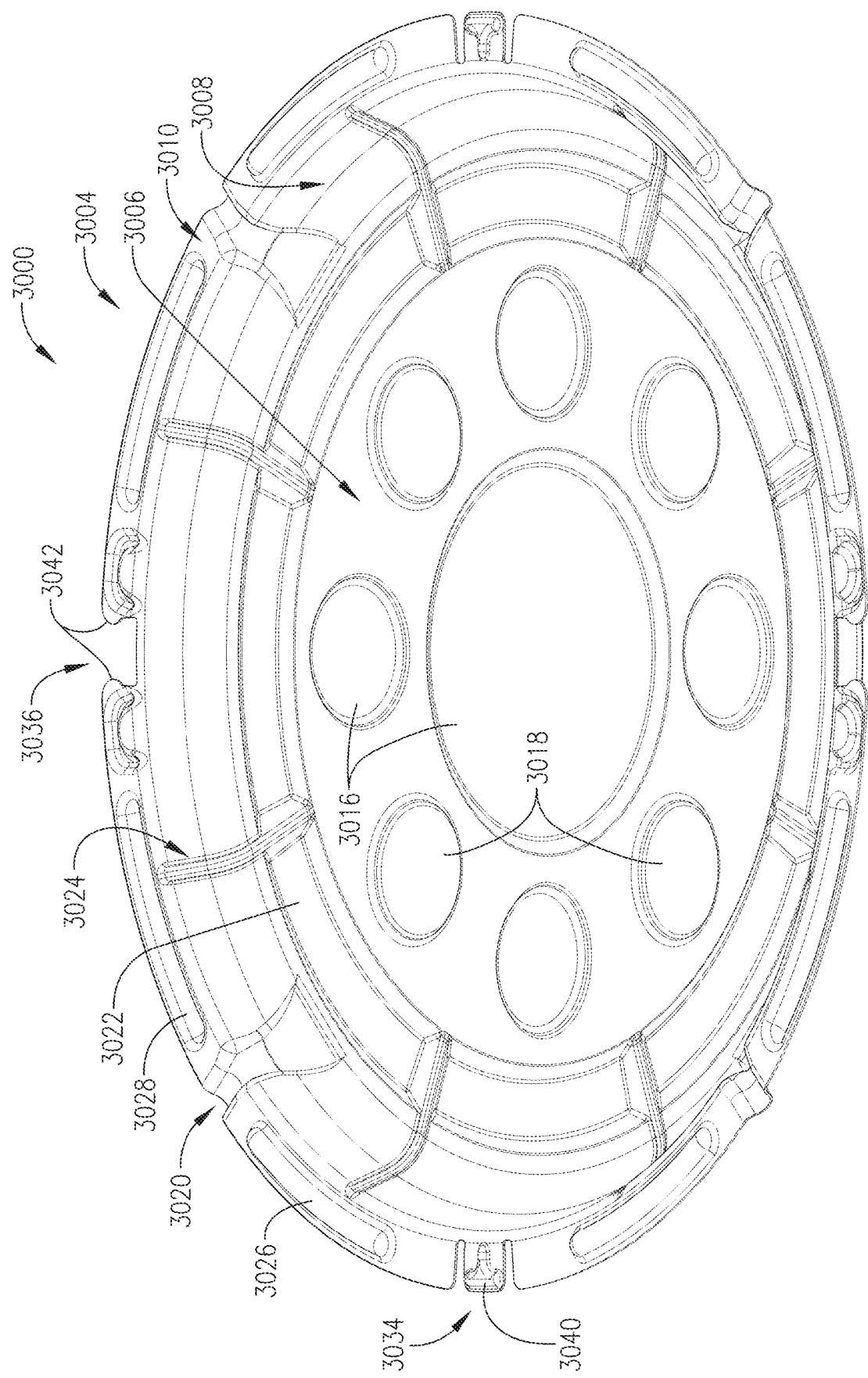
FIG. 33 is a top perspective view of a pressware product constructed in accordance with another embodiment of the invention.
Figure 34:
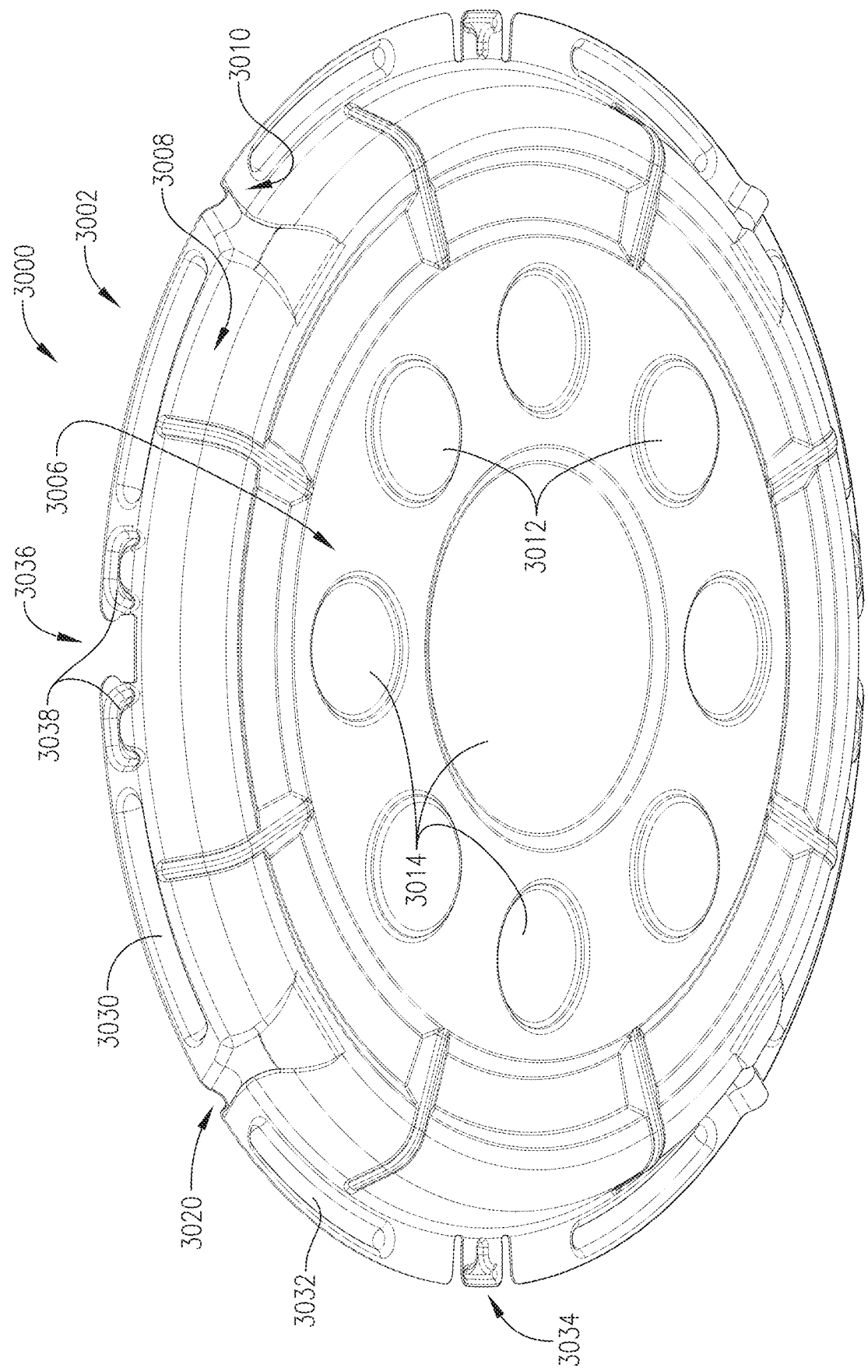
FIG. 34 is a bottom perspective view of the pressware product of FIG. 33.
Figure 35:
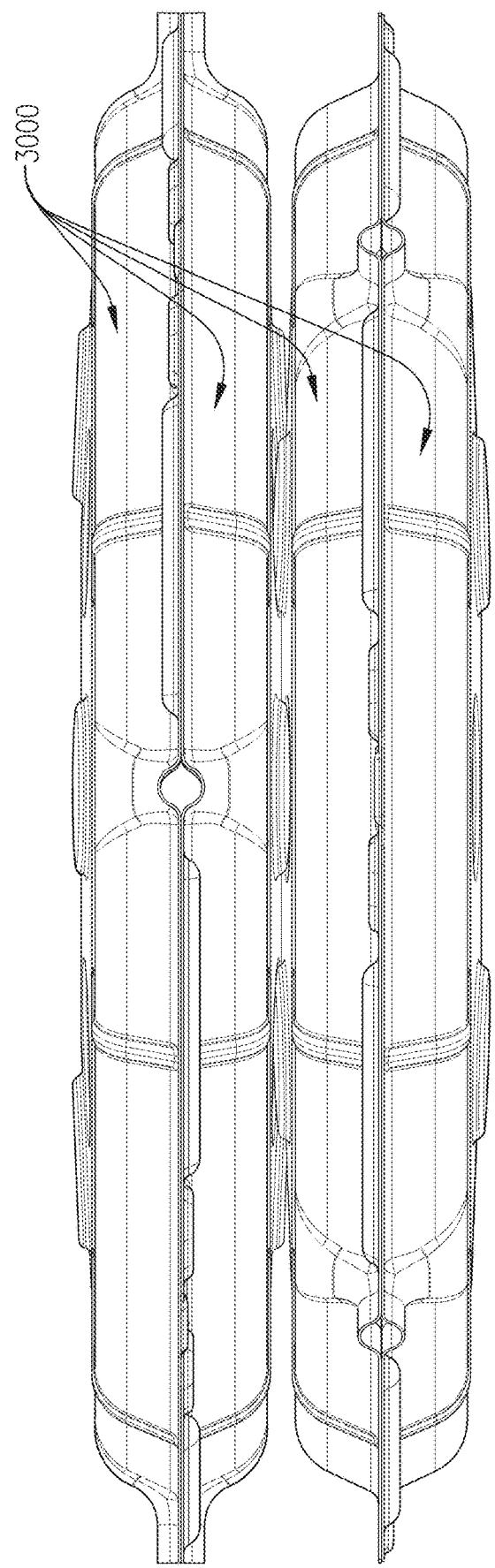
FIG. 35 is a side elevation view of several pressware products of FIG. 33 forming containers stacked together.

Turning to FIG. 33-35, a pressware product 3000 constructed in accordance with another embodiment of the invention will be described. The pressware product 3000 broadly comprises opposing first and second sides 3002, 3004, a central portion 3006, a sidewall 3008 encircling the central portion 3006, and a flange 3010 encircling the sidewall 3008. The pressware product 3000 is nominally a shell for a twelve inch pizza. Shells for a ten inch pizza and a single pizza slice are described below.

With reference to FIG. 34, the first side 3002 may generally be a convex outer side, while the second side 3004 may be a concave inner side. To that end, the first side 3002 may be configured to be nested in a second side of another pressware product in a nested stacking configuration. The first side 3002 may include a plurality of stacking lugs 3012 and a plurality of stacking recesses 3014.

The stacking lugs 3012 protrude from the first side 3002 for engaging stacking recesses of the other pressware product. The stacking lugs 3012 may be formed of the same structure as (and opposite of) grease wells described below.

The stacking recesses 3014 may be spaced from the stacking lugs 3012 for engaging stacking lugs of the other pressware product. In one embodiment, the stacking recesses 3014 may include a central stacking recess and a plurality of radial stacking recesses with the central stacking recess being larger than the radial stacking recesses. The stacking recesses 3014 may be formed of the same structure as (and opposite of) food-supporting regions described below. The stacking lugs 3012 and stacking recesses 3014 may alternate annularly around the center of the pressware product 3000.

Turning again to FIG. 33, the second side 3004 may generally be a concave inner side for receiving food. The second side 3004 also may be configured to nest a first side of the other pressware product in a nested stacking configuration. The second side 3004 may include several features which will be discussed according to their general placement with the central portion 3006, sidewall 3008, and flange 3010.

The central portion 3006 supports the food and may include a plurality of food-supporting raised regions 3016 and a plurality of grease wells 3018. In one embodiment, the central portion 3006 may also include an annular ridge 3022 and portions of a plurality of food cutter grooves 3024.

The food-supporting raised regions 3016 may be spaced apart from each other and may be configured to elevate the food above surrounding regions. The food-supporting raised regions 3016 may be formed of the same structure as (and opposite of) the stacking recesses 3014 discussed above. In one embodiment, the food-supporting raised regions 3016 may include a central raised region and a plurality of radial raised regions with the central raised region being larger than the radial raised regions. The food-supporting raised regions 3016 may also interface with stacking recesses of the other pressware product in the nested stacking configuration.

The grease wells 3018 may be spaced apart from each other and may be configured to receive grease or other liquids pooling from the food. This allows the food to remain crisp while preventing the grease or other liquids from collecting in other regions or even spilling out of the pressware product 3000. In one embodiment, the food-supporting raised regions 3016 and grease wells 3018 may alternate annularly around the center of the pressware product 3000.

The annular ridge 3022 may extend annularly near the sidewall 3008. The annular ridge 3022 may be considered a food-supporting raised region. The annular ridge 3022 may be intersected by the food cutter grooves 3024 to form distinct annular ridge 3022 sections.

The food cutter grooves 3024 extend radially starting from the central portion 3006, up the sidewall 3008, to the flange 3010. The food cutter grooves 3024 may intersect the annular ridge 3022. The food cutter grooves 3024 may be annularly spaced from each other such that a food cutter (e.g., knife or roller cutter) guided by or aligned with the food cutter grooves 3024 may cut the food into sectors. For example, a roller cutter may be used to cut a pizza pie into pizza slices. In one embodiment, each food cutter groove 3024 is opposite another food cutter groove 3024 for bisecting the food in one cut.

The sidewall 3008 encircles the central portion 3006 and extends outward therefrom at an angle or curve. The sidewall 3008 may include portions of the aforementioned food cutter grooves 3024 and vents 3020.

The vents 3020 allow hot, steamy air to leave the interior space formed by the pressware product 3000 when it is paired with another pressware product to create a container. To that end, the vents 3020 may be aligned with vents of the other pressware product.

The flange 3010 extends outward from the sidewall 3008 opposite the central portion 3006. The flange 3018 may include a plurality of alignment ridges 3026, a plurality of alignment grooves 3028, a plurality of stacking ridges 3030, a plurality of stacking grooves 3032, a plurality of flaps 3034, a plurality of slots 3036, and a plurality of reinforcement ridges 3038.

The alignment ridges 3026 may be spaced on the flange 3010 for engaging alignment grooves of the other pressware product. The alignment ridges 3026 may also be configured to engage stacking grooves of the other pressware product in the nested stacking configuration.

The alignment grooves 3028 may be spaced on the flange 3010 for engaging alignment ridges of the other pressware product. The alignment grooves 3028 may also be configured to engage stacking ridges of the other pressware product in the nested stacking configuration.

The stacking ridges 3030 (FIG. 34) may be on the first side 3002 of the pressware product 3000. The stacking ridges 3030 may be configured to engage alignment grooves of the other pressware product in the nested stacking configuration. The stacking ridges 3030 may be formed of the same structure as (and opposite of) the alignment grooves 3028.

The stacking grooves 3032 may be on the first side 3002 of the pressware product 3000. The stacking grooves 3032 may be configured to engage alignment ridges of the other pressware product in the nested stacking configuration. The stacking grooves 3032 may be formed of the same structure as (and opposite of) the alignment ridges 3026.

The flaps 3034 may be configured to be selectively inserted into slots of the other pressware product to secure the pressware products together thus forming the container. To that end, the flaps 3034 may be slightly wider than the corresponding slots. The flaps 3034 may include reinforcement ridges 3040 for ensuring the flaps 3034 remain engaged with adjacent portions of the flange 3010. Insertion of the flaps 3034 into slots may generate a distinctive pop sound indicating the flaps 3034 are secure in the slots. In one embodiment, the reinforcement ridges 3040 may be T-shaped.

The slots 3036 may be configured to selectively receive flaps of the other pressware product. At least portions of the slots 3036 may be slightly narrower than the corresponding flaps. To that end, the flange 3010 may include protrusions 3042 for engaging the flaps. Insertion of flaps into the slots 3036 may generate a distinctive pop sound indicating the flaps are secure in the slots 3036.

The reinforcement ridges 3038 (FIG. 34) may be positioned near the slots 3036 (and particularly near the protrusions 3042) on the first side 3002 to make the flange 3010 near the slots 3036 more rigid. In one embodiment, the reinforcement ridges 3038 may be U-shaped.

The above-described pressware product 3000 provides several advantages. For example, the pressware product 3000 can be compactly stacked with other pressware products in a compact nested configuration. The pressware product 3000 can be paired with another pressware product identical to or similar to the pressware product 3000 to form a container, which can be stacked with other similar containers (FIG. 35). The alignment ridges 3026 and alignment grooves 3028 ensure paired pressware products are properly aligned and remain aligned. Similarly, the stacking ridges 3030 and stacking grooves 3032 ensured nested pressware products are stacked in an orderly fashion and remain so. The flaps 3034 and slots 3036 secure paired pressware products together. The flaps 3034 make a distinct pop sound when pressed past the protrusions 3042 thus confirming the pressware products are secured together. The pressware product 3000 is compact and uses minimal material. The food-supporting raised regions 3016 and grease wells 3018 keep food crisp and fresh. The vents 3020 allow hot, steamy air to escape the container formed by two pressware products 3000, thus preventing the pressware products 3000 from breaking down.

Figure 36:
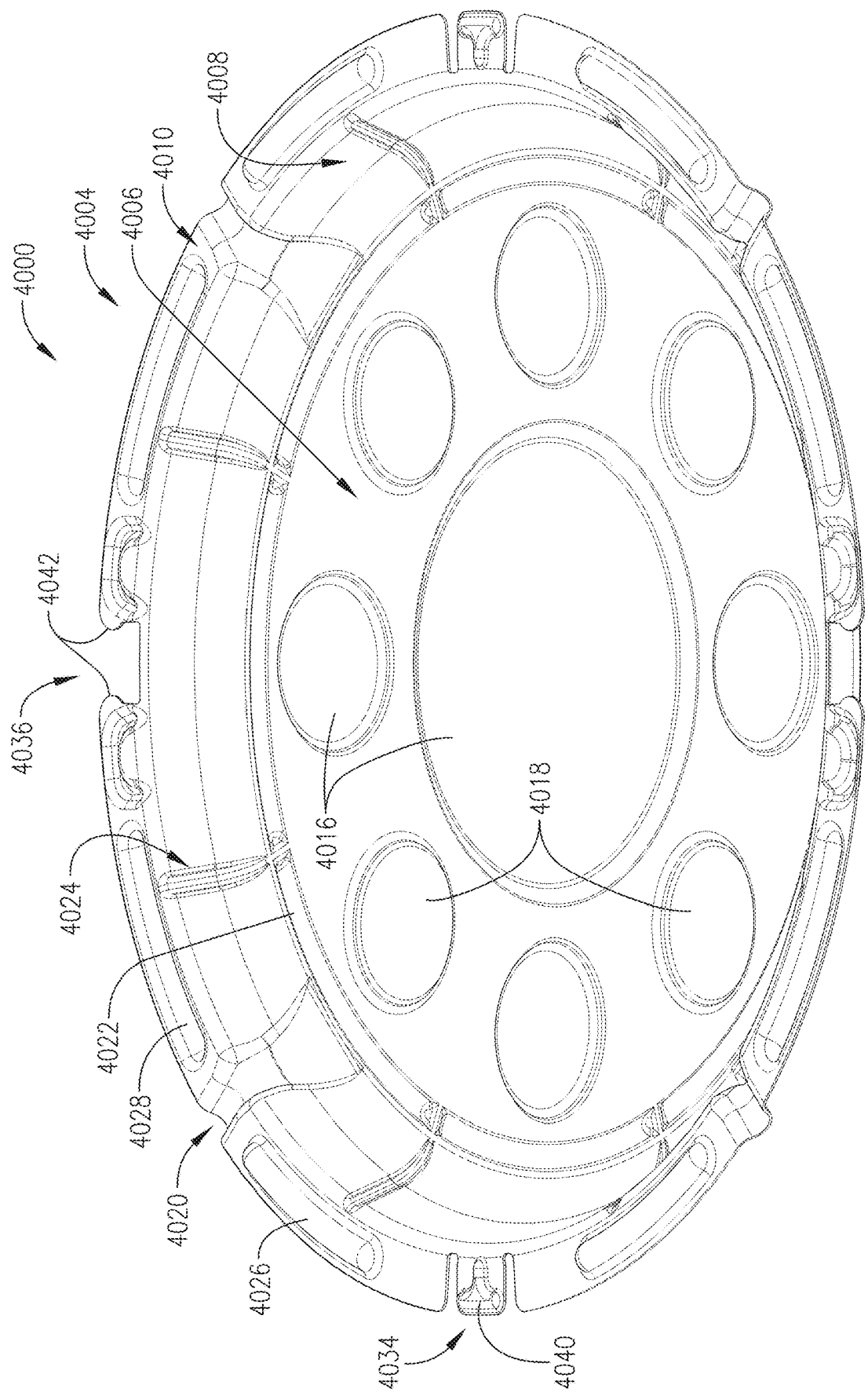
FIG. 36 is a top perspective view of a pressware product constructed in accordance with another embodiment of the invention.
Figure 37:
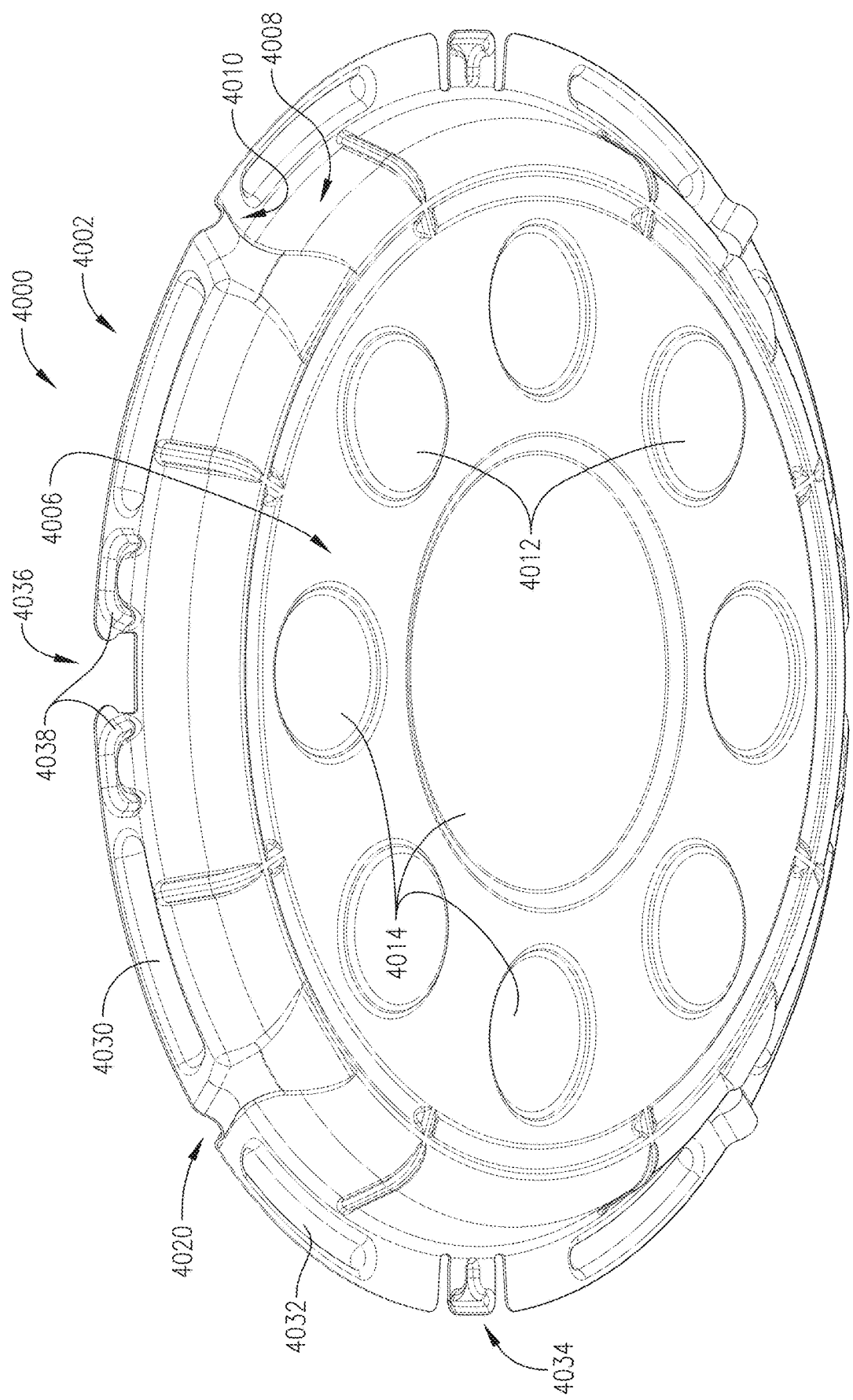
FIG. 37 is a bottom perspective view of the pressware product of FIG. 36.
Figure 38:
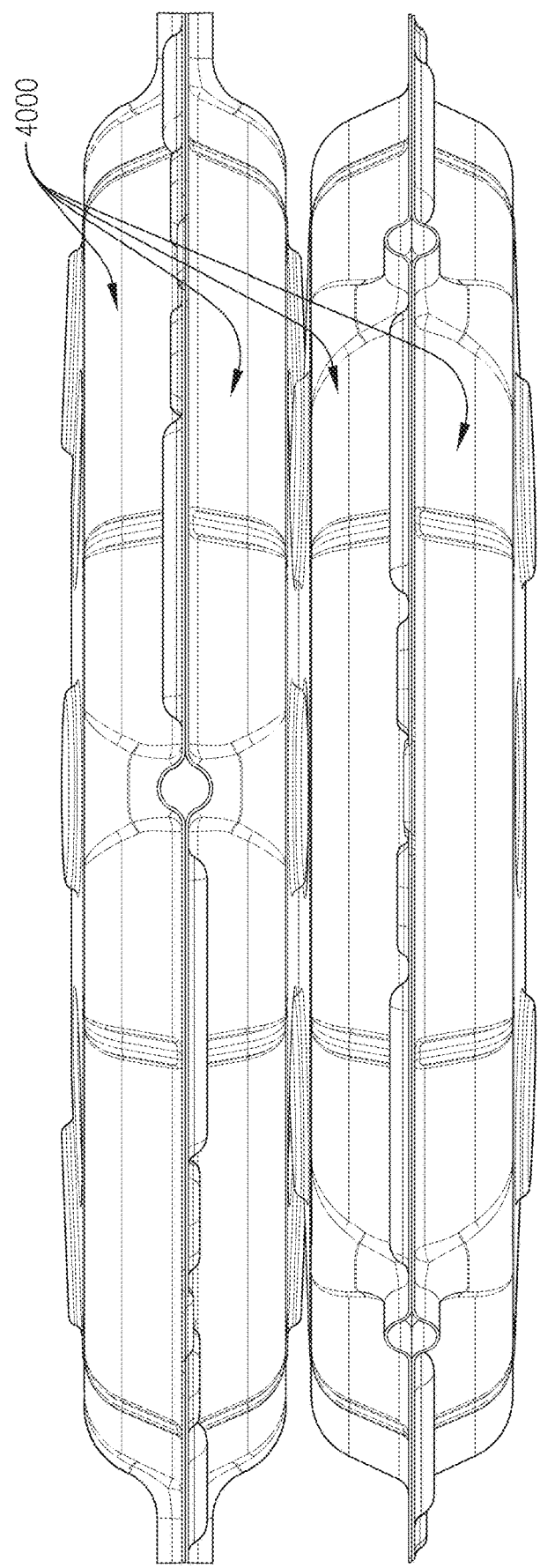
FIG. 38 is a side elevation view of several pressware products of FIG. 36 forming containers stacked together.

Turning to FIG. 36-38, a pressware product 4000 constructed in accordance with another embodiment of the invention will be described. The pressware product 4000 broadly comprises opposing first and second sides 4002, 4004. The pressware product 4000 also includes a central portion 4006, a sidewall 4008 encircling the central portion 4006, and a flange 4010 encircling the sidewall 4008. The pressware product 4000 is nominally a shell for a ten inch pizza. To that point, the features of the pressware product 4000 are substantially similar to the features of the pressware product 3000. Feature dimension, number, order, spacing, and the like may be different to accommodate the different overall size of the pressware product 3000. In one embodiment, containers formed by paired pressware products 3000 and containers formed by paired pressware products 4000 can be stacked together indiscriminately. In that way, ten inch pizzas and twelve inches pizzas can be stacked together. A shell for a single pizza slice is described below.

With reference to FIG. 37, the first side 4002 may generally be a convex outer side, while the second side 4004 may be a concave inner side. To that end, the first side 4002 may be configured to be nested in a second side of another pressware product in a nested stacking configuration. The first side 4002 may include a plurality of stacking lugs 4012 and a plurality of stacking recesses 4014.

The stacking lugs 4012 protrude from the first side 4002 for engaging stacking recesses of the other pressware product. The stacking lugs 4012 may be formed of the same structure as (and opposite of) grease wells described below.

The stacking recesses 4014 may be spaced from the stacking lugs 4012 for engaging stacking lugs of the other pressware product. In one embodiment, the stacking recesses 4014 may include a central stacking recess and a plurality of radial stacking recesses with the central stacking recess being larger than the radial stacking recesses. The stacking recesses 4014 may be formed of the same structure as (and opposite of) food-supporting regions described below. The stacking lugs 4012 and stacking recesses 4014 may alternate annularly around the center of the pressware product 4000.

With reference to FIG. 36, the second side 4004 may generally be a concave inner side for receiving food. The second side 4004 also may be configured to nest a first side of the other pressware product in a nested stacking configuration. The second side 4004 may include several features which will be discussed according to their general placement with the central portion 4006, sidewall 4008, and flange 4010.

The central portion 4006 supports the food and may include a plurality of food-supporting raised regions 4016 and a plurality of grease wells 4018. In one embodiment, the central portion 4006 may also include an annular ridge 4022 and portions of a plurality of food cutter grooves 4024.

The food-supporting raised regions 4016 may be spaced apart from each other and may be configured to elevate the food above surrounding regions. The food-supporting raised regions 4016 may be formed of the same structure as (and opposite of) the stacking recesses 4014 discussed above. In one embodiment, the food-supporting raised regions 4016 may include a central raised region and a plurality of radial raised regions with the central raised region being larger than the radial raised regions. The food-supporting raised regions 4016 may also interface with stacking recesses of the other pressware product in the nested stacking configuration.

The grease wells 4018 may be spaced apart from each other and may be configured to receive grease or other liquids pooling from the food. This allows the food to remain crisp while preventing the grease or other liquids from collecting in other regions or even spilling out of the pressware product 4000. In one embodiment, the food-supporting raised regions 4016 and grease wells 4018 may alternate annularly around the center of the pressware product 4000.

The annular ridge 4022 may extend annularly near the sidewall 4008. The annular ridge 4022 may be considered a food-supporting raised region. The annular ridge 4022 may be intersected by the food cutter grooves 4024 to form distinct annular ridge 4022 sections. The annular ridge 4022 may be significantly narrower than the annular ridge 3022 described above.

The food cutter grooves 4024 extend radially starting from the central portion 4006, up the sidewall 4008, to the flange 4010. The food cutter grooves 4024 may intersect the annular ridge 4022. The food cutter grooves 4024 may be annularly spaced from each other such that a food cutter (e.g., knife or roller cutter) guided by or aligned with the food cutter grooves 4024 may cut the food into sectors. For example, a roller cutter may be used to cut a pizza pie into pizza slices. In one embodiment, each food cutter groove 4024 is opposite another food cutter groove 4024 for bisecting the food in one cut.

The sidewall 4008 encircles the central portion 4006 and extends outward therefrom at an angle or curve. The sidewall 4008 may include portions of the aforementioned food cutter grooves 4024 and vents 4020.

The vents 4020 allow hot, steamy air to leave the interior space formed by the pressware product 4000 when it is paired with another pressware product to create a container. To that end, the vents 4020 may be aligned with vents of the other pressware product.

The flange 4010 extends outward from the sidewall 4008 opposite the central portion 4006. The flange 4018 may include a plurality of alignment ridges 4026, a plurality of alignment grooves 4028, a plurality of stacking ridges 4030, a plurality of stacking grooves 4032, a plurality of flaps 4034, a plurality of slots 4036, and a plurality of reinforcement ridges 4038.

The alignment ridges 4026 may be spaced on the flange 4010 for engaging alignment grooves of the other pressware product. The alignment ridges 4026 may also be configured to engage stacking grooves of the other pressware product in the nested stacking configuration.

The alignment grooves 4028 may be spaced on the flange 4010 for engaging alignment ridges of the other pressware product. The alignment grooves 4028 may also be configured to engage stacking ridges of the other pressware product in the nested stacking configuration.

The stacking ridges 4030 (FIG. 37) may be on the first side 4002 of the pressware product 4000. The stacking ridges 4030 may be configured to engage alignment grooves of the other pressware product in the nested stacking configuration. The stacking ridges 4030 may be formed of the same structure as (and opposite of) the alignment grooves 4028.

The stacking grooves 4032 may be on the first side 4002 of the pressware product 4000. The stacking grooves 4032 may be configured to engage alignment ridges of the other pressware product in the nested stacking configuration. The stacking grooves 4032 may be formed of the same structure as (and opposite of) the alignment ridges 4026.

The flaps 4034 may be configured to be selectively inserted into slots of the other pressware product to secure the pressware products together thus forming the container. To that end, the flaps 4034 may be slightly wider than the corresponding slots. The flaps 4034 may include reinforcement ridges 4040 for ensuring the flaps 4034 remain engaged with adjacent portions of the flange 4010. Insertion of the flaps 4034 into slots may generate a distinctive pop sound indicating the flaps 4034 are secure in the slots. In one embodiment, the reinforcement ridges 4040 may be T-shaped.

The slots 4036 may be configured to selectively receive flaps of the other pressware product. At least portions of the slots 4036 may be slightly narrower than the corresponding flaps. To that end, the flange 4010 may include protrusions 4042 for engaging the flaps. Insertion of flaps into the slots 4036 may generate a distinctive pop sound indicating the flaps are secure in the slots 4036.

The reinforcement ridges 4038 (FIG. 37) may be positioned near the slots 4036 (and particularly near the protrusions 4042) on the first side 3002 to make the flange 4010 near the slots 4036 more rigid. In one embodiment, the reinforcement ridges 4038 may be U-shaped.

The above-described pressware product 4000 provides several advantages. For example, the pressware product 4000 can be compactly stacked with other pressware products in a compact nested configuration. The pressware product 4000 can be paired with another pressware product identical to or similar to the pressware product 4000 to form a container, which can be stacked with other similar containers (FIG. 38). The alignment ridges 4026 and alignment grooves 4028 ensure paired pressware products are properly aligned and remain aligned. Similarly, the stacking ridges 4030 and stacking grooves 4032 ensured nested pressware products are stacked in an orderly fashion and remain so. The flaps 4034 and slots 4036 secure paired pressware products together. The flaps 4034 make a distinct pop sound when pressed past the protrusions 4042 thus confirming the pressware products are secured together. The pressware product 4000 is compact and uses minimal material. The food-supporting raised regions 4016 and grease wells 4018 keep food crisp and fresh. The vents 4020 allow hot, steamy air to escape the container formed by two pressware products 4000, thus preventing the pressware products 4000 from breaking down.

Figure 39:
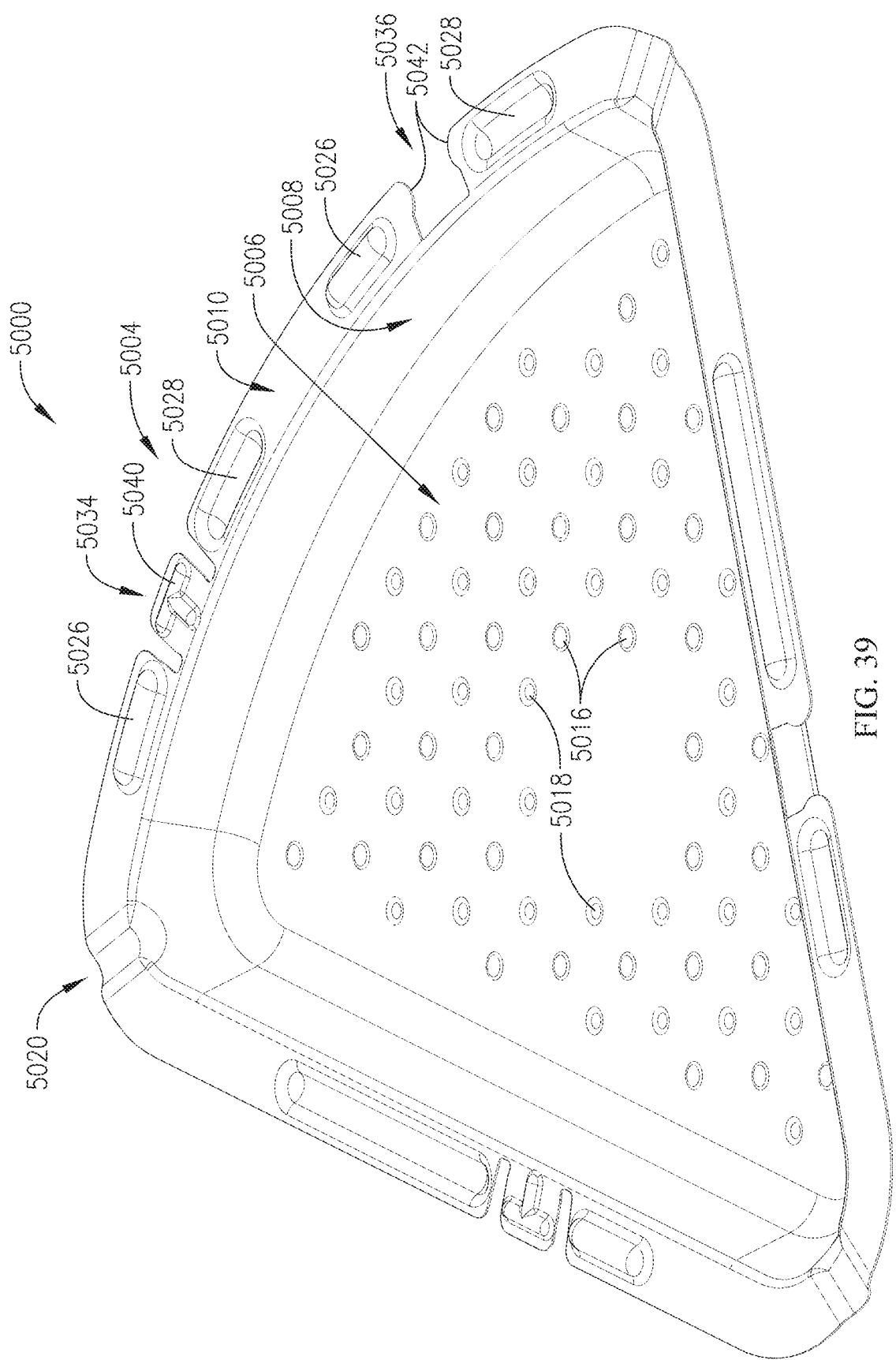
FIG. 39 is a top perspective view of a pressware product constructed in accordance with another embodiment of the invention.
Figure 40:
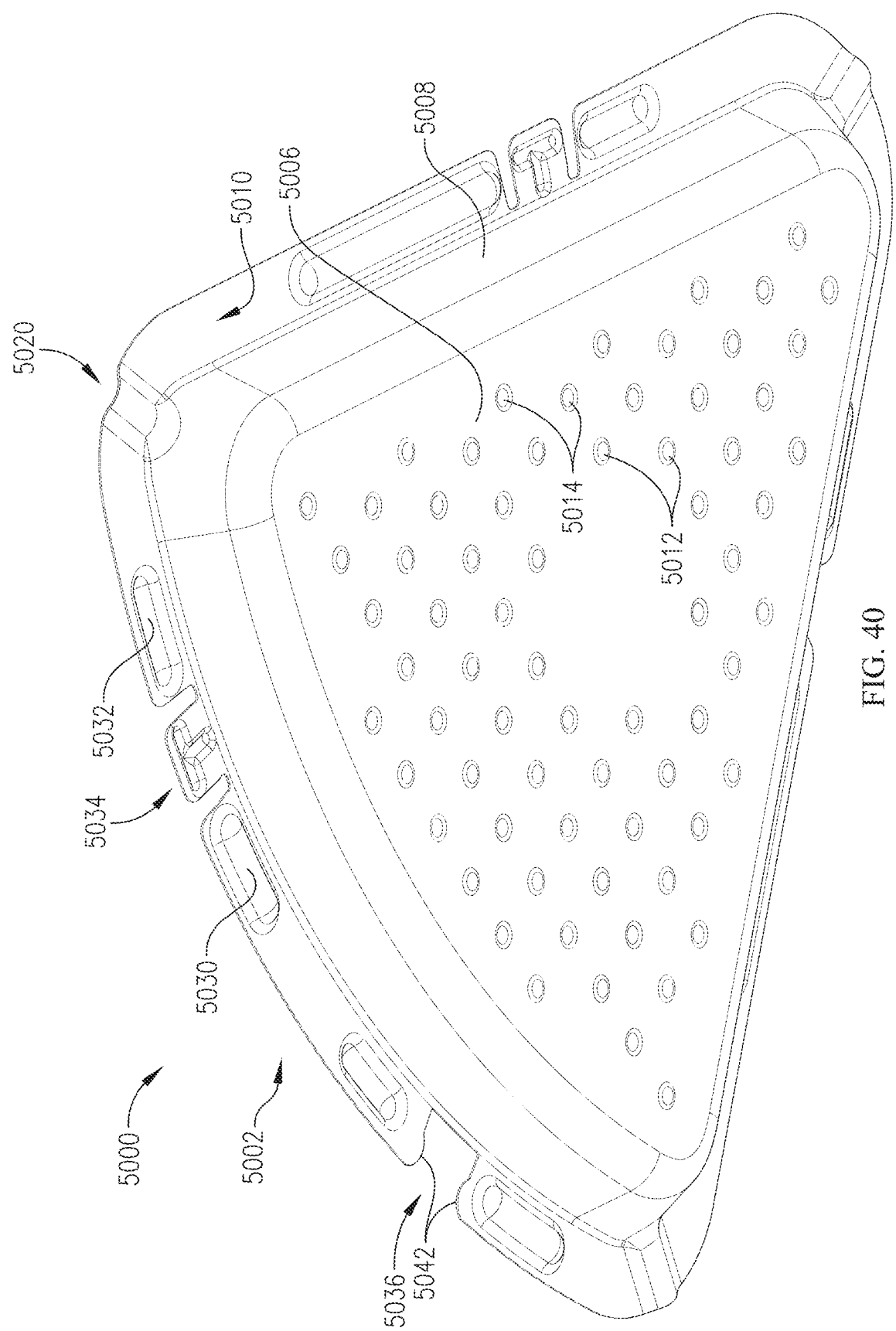
FIG. 40 is a bottom perspective view of the pressware product of FIG. 39.
Figure 41:
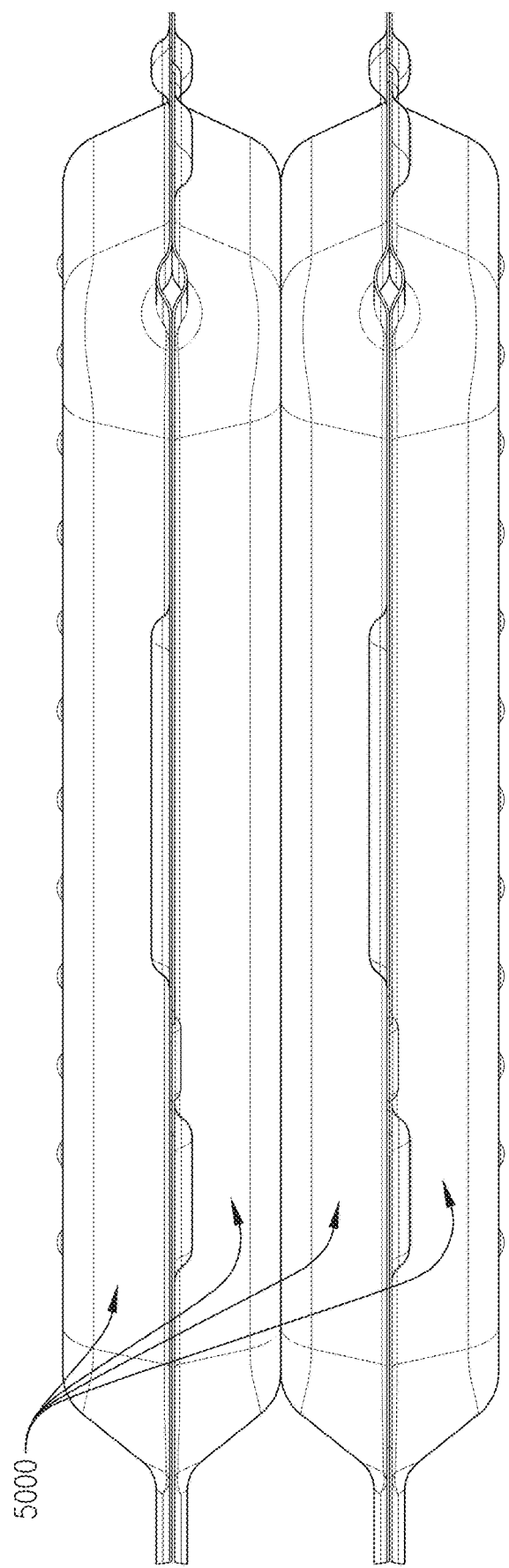
FIG. 41 is a side elevation view of several pressware products of FIG. 39 forming containers stacked together.

Turning to FIG. 39-41, a pressware product 5000 constructed in accordance with another embodiment of the invention will be described. The pressware product 5000 broadly comprises opposing first and second sides 5002, 5004. The pressware product 5000 also includes a central portion 5006, a sidewall 5008 encircling the central portion 5006, and a flange 5010 encircling the sidewall 5008.

With reference to FIG. 40, the first side 5002 may generally be a convex outer side, while the second side 5004 may be a concave inner side. To that end, the first side 5002 may be configured to be nested in a second side of another pressware product in a nested stacking configuration. The first side 5002 may include a plurality of stacking lugs 5012 and a plurality of stacking recesses 5014. The pressware product 5000 is nominally a shell for a single slice of pizza. Many of the features of the pressware product 5000 are similar of the pressware products 3000, 4000 described above, but feature dimension, number, order, spacing, and the like may be different to accommodate the single slice shape of the pressware product 5000.

The stacking lugs 5012 protrude from the first side 5002 for engaging stacking recesses of the other pressware product. The stacking lugs 5012 may be formed of the same structure as (and opposite of) grease wells described below. The stacking lugs 5002 may be small nubs compared to previously-describe stacking lugs.

The stacking recesses 5014 may be spaced from the stacking lugs 5012 for engaging stacking lugs of the other pressware product. The stacking recesses 5014 may be formed of the same structure as (and opposite of) food-supporting regions described below. The stacking lugs 5012 and stacking recesses 5014 may alternate in a grid.

With reference to FIG. 39, the second side 5004 may generally be a concave inner side for receiving food. The second side 5004 also may be configured to nest a first side of the other pressware product in a nested stacking configuration. The second side 5004 may include several features which will be discussed according to their general placement with the central portion 5006, sidewall 5008, and flange 5010.

The central portion 5006 supports the food and may include a plurality of food-supporting raised regions 5016 and a plurality of grease wells 5018. The food-supporting raised regions 5016 may be small nubs compared to previously-described food-supporting raised regions.

The food-supporting raised regions 5016 may be spaced apart from each other and may be configured to elevate the food above surrounding regions. The food-supporting raised regions 5016 may be formed of the same structure as (and opposite of) the stacking recesses 5014 discussed above. The food-supporting raised regions 5016 may also interface with stacking recesses of the other pressware product in the nested stacking configuration.

The grease wells 5018 may be spaced apart from each other and may be configured to receive grease or other liquids pooling from the food. This allows the food to remain crisp while preventing the grease or other liquids from collecting in other regions or even spilling out of the pressware product 5000. In one embodiment, the food-supporting raised regions 5016 and grease wells 5018 may alternate in a grid.

The sidewall 5008 encircles the central portion 5006 and extends outward therefrom at an angle or curve. The sidewall 5008 may include portions of vents 5020.

The vents 5020 allow hot, steamy air to leave the interior space formed by the pressware product 5000 when it is paired with another pressware product to create a container. To that end, the vents 5020 may be aligned with vents of the other pressware product.

The flange 5010 extends outward from the sidewall 5008 opposite the central portion 5006. The flange 5018 may include a plurality of alignment ridges 5026, a plurality of alignment grooves 5028, a plurality of stacking ridges 5030, a plurality of stacking grooves 5032, a plurality of flaps 5034, and a plurality of slots 5036.

The alignment ridges 5026 may be spaced on the flange 5010 for engaging alignment grooves of the other pressware product. The alignment ridges 5026 may also be configured to engage stacking grooves of the other pressware product in the nested stacking configuration.

The alignment grooves 5028 may be spaced on the flange 5010 for engaging alignment ridges of the other pressware product. The alignment grooves 5028 may also be configured to engage stacking ridges of the other pressware product in the nested stacking configuration.

The stacking ridges 5030 (FIG. 40) may be on the first side 5002 of the pressware product 5000. The stacking ridges 5030 may be configured to engage alignment grooves of the other pressware product in the nested stacking configuration. The stacking ridges 5030 may be formed of the same structure as (and opposite of) the alignment grooves 5028.

The stacking grooves 5032 may be on the first side 5002 of the pressware product 5000. The stacking grooves 5032 may be configured to engage alignment ridges of the other pressware product in the nested stacking configuration. The stacking grooves 5032 may be formed of the same structure as (and opposite of) the alignment ridges 5026.

The flaps 5034 may be configured to be selectively inserted into slots of the other pressware product to secure the pressware products together thus forming the container. To that end, the flaps 5034 may be slightly wider than the corresponding slots. The flaps 5034 may include reinforcement ridges 5040 for ensuring the flaps 5034 remain engaged with adjacent portions of the flange 5010. Insertion of the flaps 5034 into slots may generate a distinctive pop sound indicating the flaps 5034 are secure in the slots. In one embodiment, the reinforcement ridges 5040 may be T-shaped.

The slots 5036 may be configured to selectively receive flaps of the other pressware product. At least portions of the slots 5036 may be slightly narrower than the corresponding flaps. To that end, the flange 5010 may include protrusions 5042 for engaging the flaps. Insertion of flaps into the slots

5036 may generate a distinctive pop sound indicating the flaps are secure in the slots 5036.

The above-described presswhere product 5000 provides several advantages. For example, the presswhere product 5000 can be compactly stacked with other presswhere products in a compact nested configuration. The presswhere product 5000 can be paired with another presswhere product identical to or similar to the presswhere product 5000 to form a container, which can be stacked with other similar containers (FIG. 41). The alignment ridges 5026 and alignment grooves 5028 ensure paired presswhere products are properly aligned and remain aligned. Similarly, the stacking ridges 5030 and stacking grooves 5032 ensured nested presswhere products are stacked in an orderly fashion and remain so. The flaps 5034 and slots 5036 secure paired presswhere products together. The flaps 5034 make a distinct pop sound when pressed past the protrusions 5042 thus confirming the presswhere products are secured together. The presswhere product 5000 is compact and uses minimal material. The food-supporting raised regions 5016 and grease wells 5018 keep food crisp and fresh. The vents 5020 allow hot, steamy air to escape the container formed by two presswhere products 5000, thus preventing the presswhere products 5000 from breaking down.

Although the invention has been described with reference to example embodiments illustrated in the attached drawing figures, it is noted that equivalents may be employed and substitutions made herein without departing from the scope of the invention as described and claimed herein.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

The invention claimed is:

1. A forming tool for forming a pressware product, the forming tool comprising:
   a positive mold plate including an annular protrusion and a plurality of elongated radial protrusions extending radially outward from the annular protrusion;
   a positive mold block positioned within the annular protrusion;
   a negative mold plate defining a circular cavity operable to receive the annular protrusion and including a plurality of radial grooves extending radially from the cavity and operable to receive the elongated radial protrusions; and
   a negative mold block secured to the negative mold plate within the cavity.

2. The forming tool of claim 1, wherein the positive mold plate includes a first guide protrusion positioned at least partially radially outward of a perimeter of the annular protrusion and extending parallel to the perimeter along a segment of the annular protrusion, and the negative mold plate includes a corresponding first guide recess configured to receive the guide protrusion.

3. The forming tool of claim 2, wherein a top of the guide protrusion and a top of the segment of the annular protrusion define a trough therebetween.

4. The forming tool of claim 3, wherein the positive mold plate includes a second guide recess at least partially positioned radially outward from the perimeter of the annular protrusion and spaced apart from the elongated guide protrusion, and the negative mold plate includes a corresponding second guide protrusion operable to extend into the second guide recess.

5. The forming tool of claim 4, wherein the first guide recess is longer than the second guide recess, and the first guide protrusion is longer than the second guide protrusion.

6. The forming tool of claim 1, wherein at least one of the positive mold block or the negative mold block include at least one of protrusions or indentations.

7. The forming tool of claim 6, wherein the at least one of protrusions or indentations form stacking structures on the pressware product.

8. The forming tool of claim 1, wherein at least one of the positive mold plate or the negative mold plate includes projections for forming indicia on the pressware product.

9. The forming tool of claim 8, wherein the projections comprise bumps and raised text.

10. The forming tool of claim 1, further comprising:
    a plurality of additional positive mold plates, each of the additional positive mold plates including an annular protrusion and a plurality of elongated radial protrusions extending radially outward from the annular protrusion;
    a plurality of additional positive mold blocks, each of the additional positive mold blocks positioned within one of the annular protrusions;
    a plurality of additional negative mold plates, each of the additional negative mold plates defining a circular cavity operable to receive one of the annular protrusions and including a plurality of radial grooves extending radially from the cavity and operable to receive the elongated radial protrusions; and
    a plurality of additional negative mold blocks, each of the additional negative mold blocks secured to one of the negative mold plates within the corresponding cavity.

11. The forming tool of claim 1, further comprising trimming edges configured to cut the pressware product from a web.

12. The forming tool of claim 1, wherein the positive mold plate comprises a locking flap protrusion spaced radially apart from the annular protrusion, and the negative mold plate includes a corresponding locking flap recess operable to receive the locking flap protrusion.

13. A system for manufacturing a pressware product from a web, the system comprising:

a forming station configured to receive the web and comprising:
  a positive mold assembly comprising:
    a positive mold plate including an annular protrusion and a plurality of elongated radial protrusions extending radially outward from the annular protrusion;
    a positive mold block positioned within the annular protrusion;
  a negative mold assembly comprising:
    a negative mold plate defining a circular cavity operable to receive the annular protrusion and including a plurality of grooves extending radially from the cavity and operable to receive the elongated radial protrusions;
    a negative mold block secured to the negative mold plate within the cavity; and
  an actuator configured to cause the positive mold assembly and the negative mold assembly press against the web to form a shape of the pressware product; and
a scoring station configured to receive the formed shape of the pressware product, the scoring station comprising one or more edges operable to form one or more slits in the web about the shape of the pressware product to facilitate formation of a flap in the pressware product.

14. The system of claim 13, wherein the one or more edges comprise at least one of (a) a knife tool and a striker plate or (b) a match metal trim comprising a female die and a punch.

15. The system of claim 13, further comprising a trimming station operable to receive the web having the one or more slits and comprising one or more edges operable to trim the pressware product from the web.

16. The system of claim 13, further comprising an extractor assembly comprising:
  a rail extending along and defining a lateral rail axis;
  a first car including a first car frame and an extractor element operable to releasably hold the pressware product;
  a second car slidably supported by the rail to slide laterally relative to the rail along the lateral rail axis, with the first car being supported to slide laterally with the second car; and
  a powered drive mechanism shiftably supporting the first car relative to the second car for vertical movement of the extractor elements relative to the trimming station,
  wherein the powered drive mechanism is configured to shift the first car between a lowered position, in which the extractor element is positioned to engage the pressware product positioned in the trimming station, and a raised position, in which the pressware product is lifted by the extractor element out of engagement with the trimming station.

* * * * *